(12) United States Patent
Nashida et al.

(10) Patent No.: US 8,942,510 B2
(45) Date of Patent: Jan. 27, 2015

(54) APPARATUS AND METHOD FOR SWITCHING A DISPLAY MODE

(71) Applicant: Sony Corporation, Tokyo (JP)

(72) Inventors: Tatsushi Nashida, Kanagawa (JP); Junichi Rekimoto, Kanagawa (JP)

(73) Assignee: Sony Corporation (JP)

( * ) Notice: Subject to any disclaimer, the term of this patent is extended or adjusted under 35 U.S.C. 154(b) by 147 days.

(21) Appl. No.: 13/667,423

(22) Filed: Nov. 2, 2012

(65) Prior Publication Data
US 2013/0301925 A1 Nov. 14, 2013

(30) Foreign Application Priority Data

Nov. 9, 2011 (JP) ................................. 2011-245301

(51) Int. Cl.
- *G06K 9/36* (2006.01)
- *G09G 5/00* (2006.01)
- *H04N 9/74* (2006.01)
- *G06K 9/00* (2006.01)
- *G06T 11/60* (2006.01)

(52) U.S. Cl.
CPC ............ *G06K 9/00362* (2013.01); *G06T 11/60* (2013.01)
USPC ............................ 382/284; 345/629; 348/588

(58) Field of Classification Search
CPC ....................... G06K 2009/2045; H04N 1/387
USPC ..................... 382/195, 284; 345/634; 348/588
See application file for complete search history.

(56) References Cited

U.S. PATENT DOCUMENTS

| | | | | |
|---|---|---|---|---|
| 7,577,310 | B2 * | 8/2009 | Kinjo | 382/274 |
| 2003/0128890 | A1 * | 7/2003 | Roesch et al. | 382/276 |
| 2005/0196021 | A1 * | 9/2005 | Seto et al. | 382/118 |
| 2005/0207733 | A1 * | 9/2005 | Gargi | 386/68 |
| 2008/0069439 | A1 * | 3/2008 | Kwak et al. | 382/162 |
| 2008/0107355 | A1 * | 5/2008 | Onuki | 382/284 |
| 2008/0291123 | A1 * | 11/2008 | Kondo et al. | 345/55 |
| 2009/0138811 | A1 * | 5/2009 | Horiuchi et al. | 715/768 |
| 2011/0222793 | A1 * | 9/2011 | Ueda et al. | 382/284 |
| 2012/0008848 | A1 * | 1/2012 | Beck | 382/132 |

FOREIGN PATENT DOCUMENTS

JP 2009-053328 A 3/2009

* cited by examiner

*Primary Examiner* — Yubin Hung

(74) *Attorney, Agent, or Firm* — Lerner, David, Littenberg, Krumholz & Mentlik, LLP

(57) ABSTRACT

There is provided an image processing device including an input image acquisition portion that acquires an input image, a past image acquisition portion that acquires a past image of a photographic subject in the input image, a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image, and a display control portion that superimposes the past image on the input image in accordance with the mode selected by the mode selection portion.

12 Claims, 20 Drawing Sheets

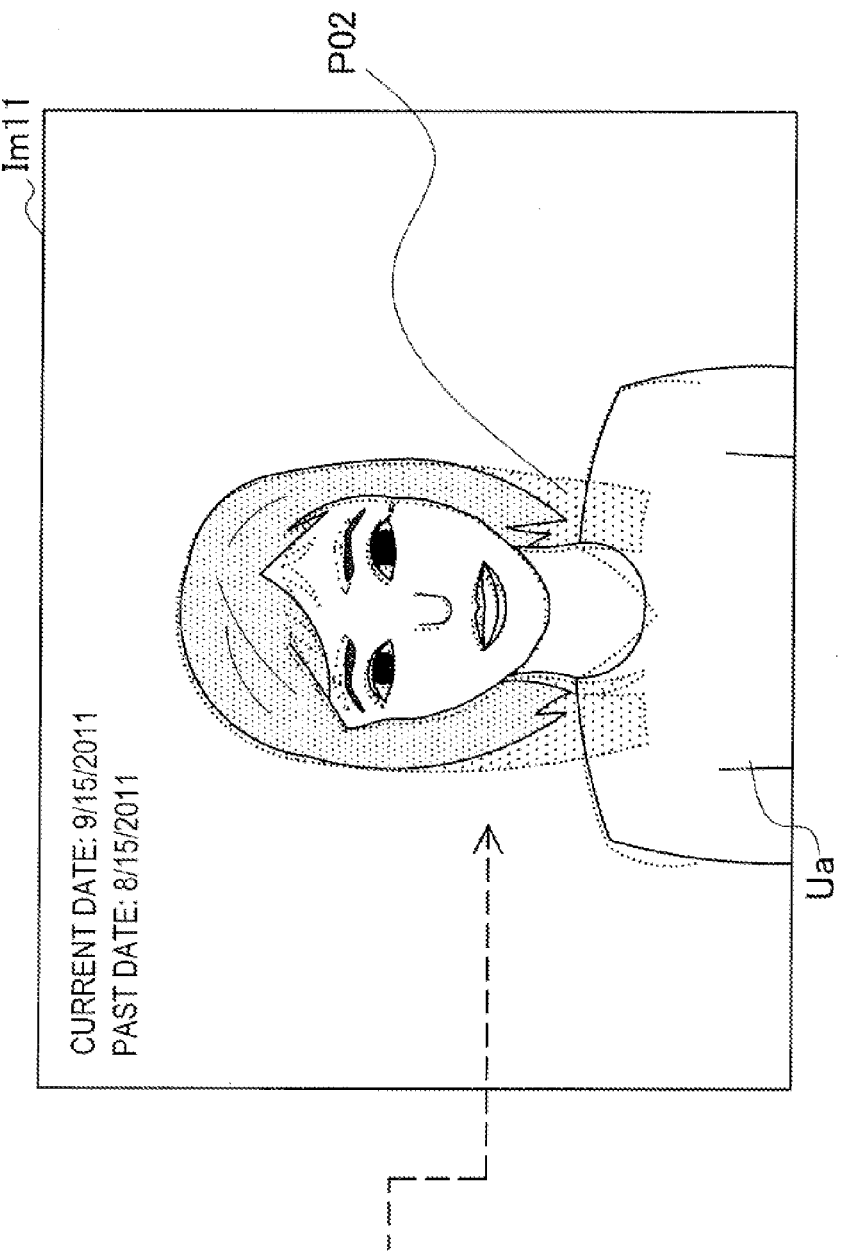

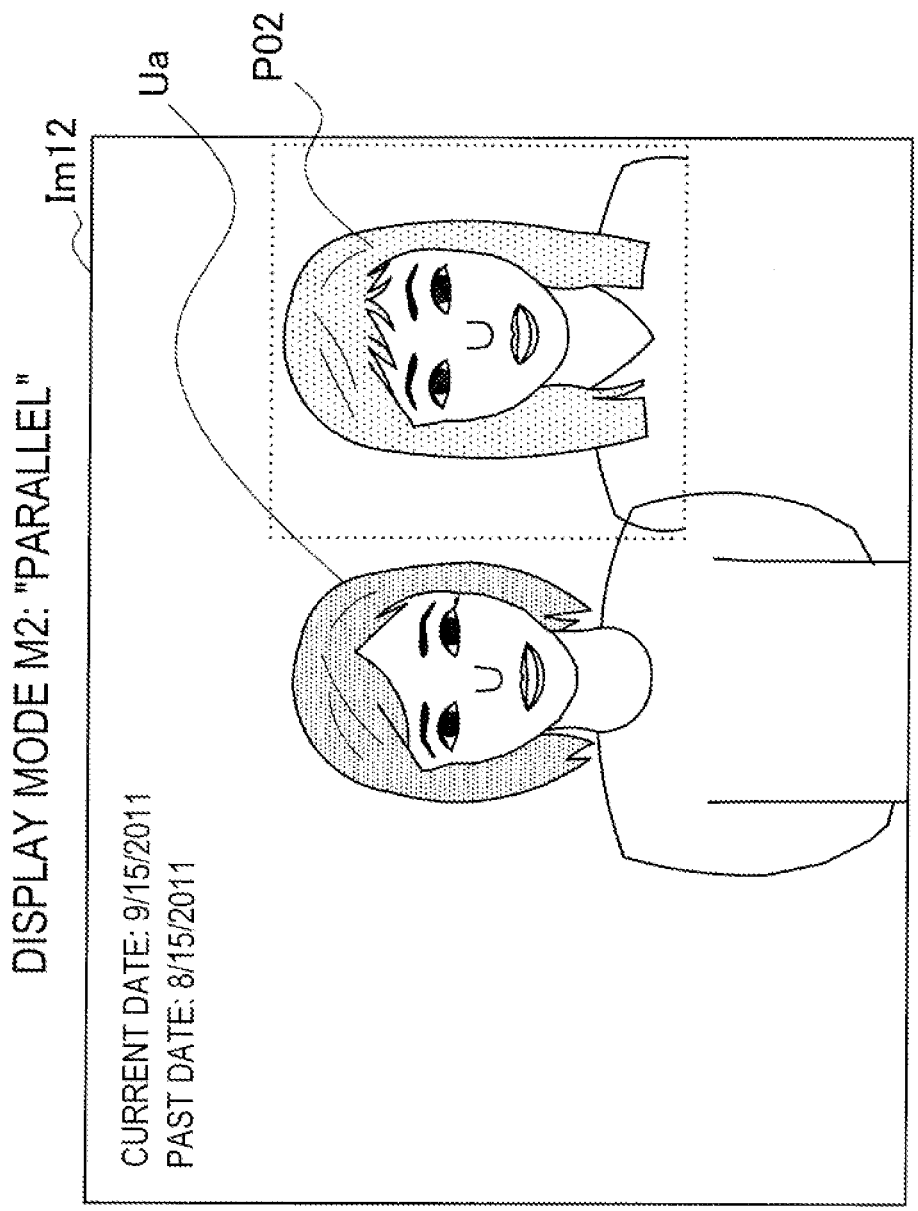

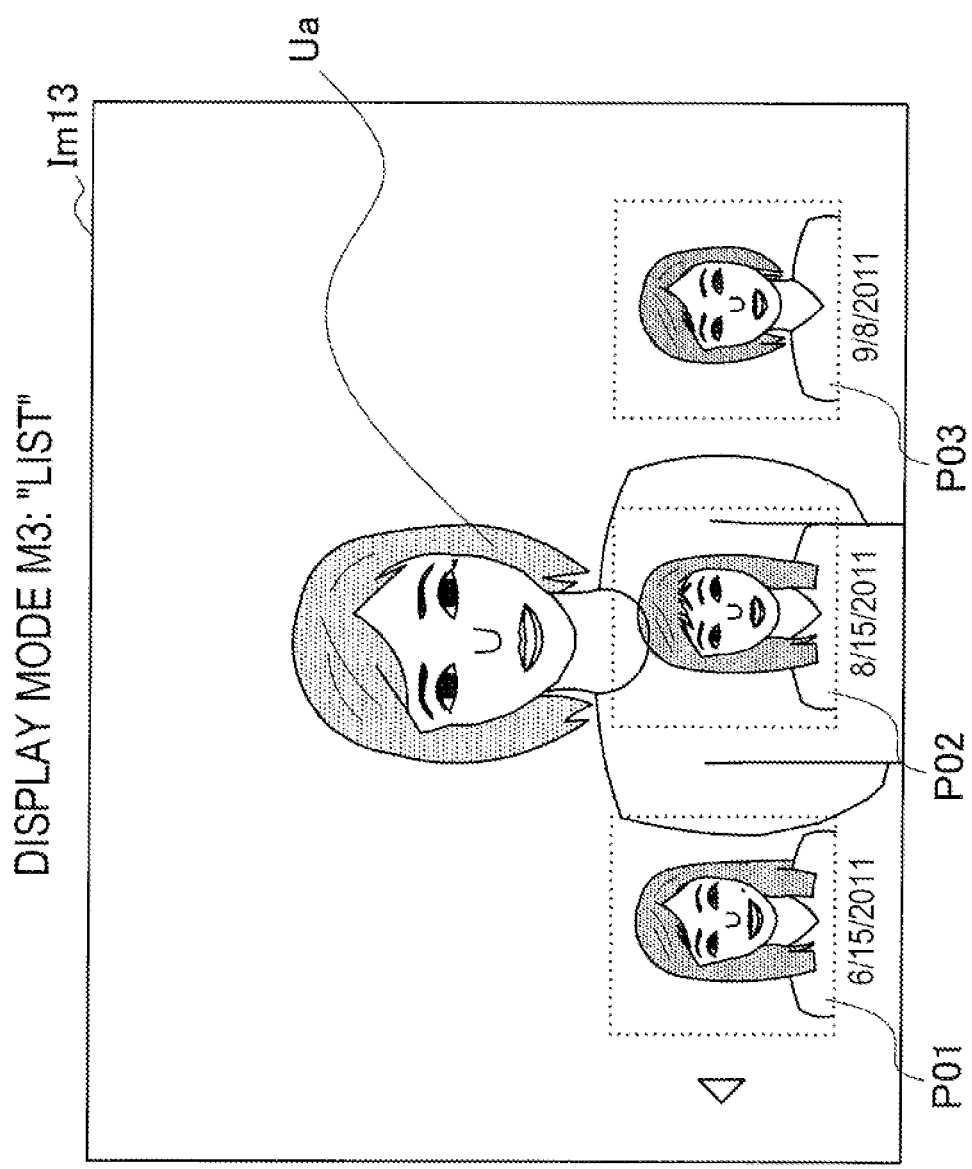

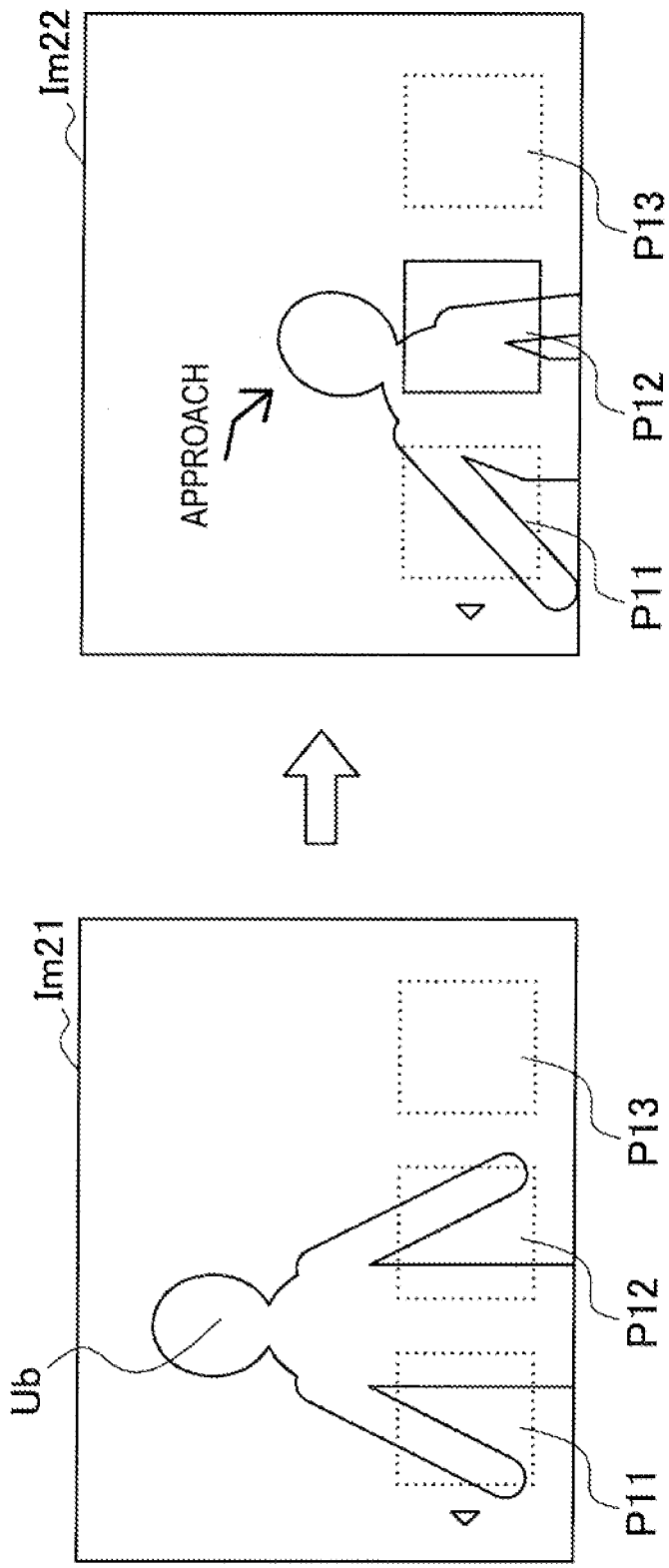

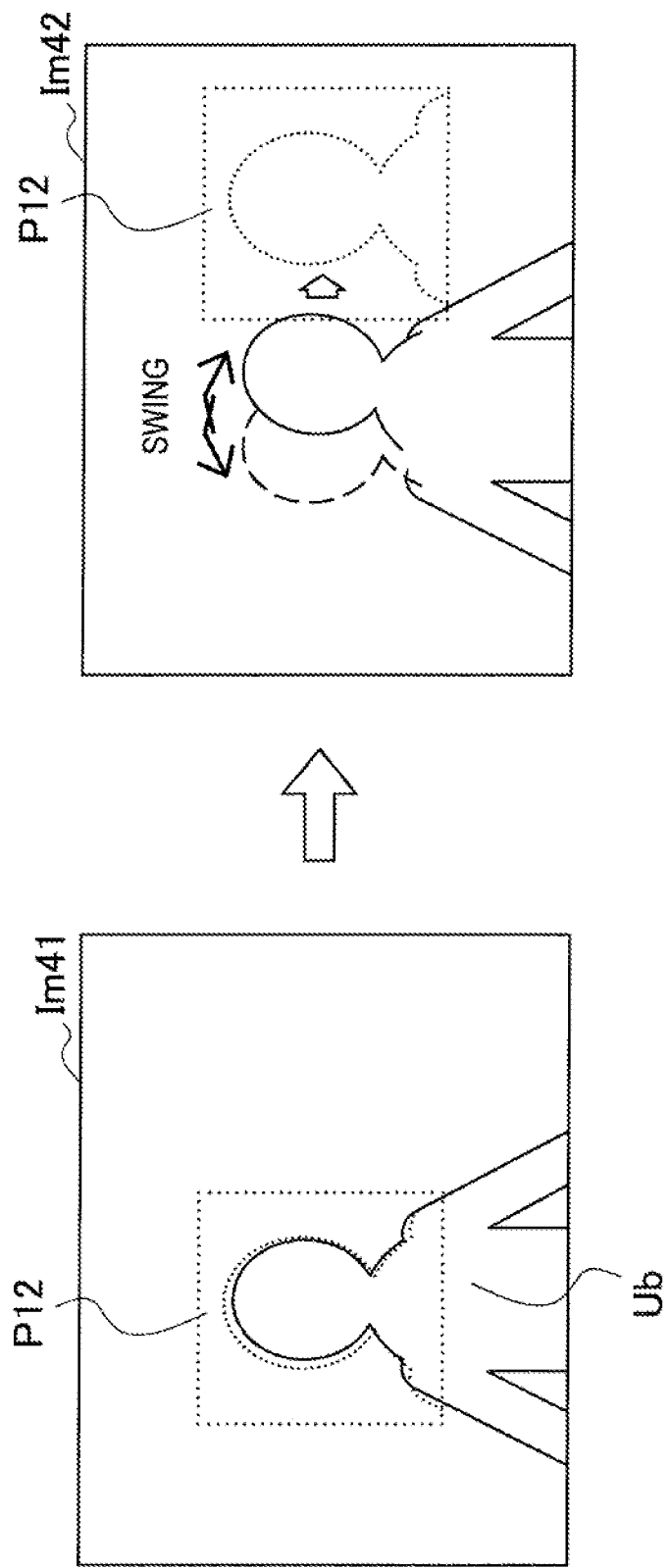

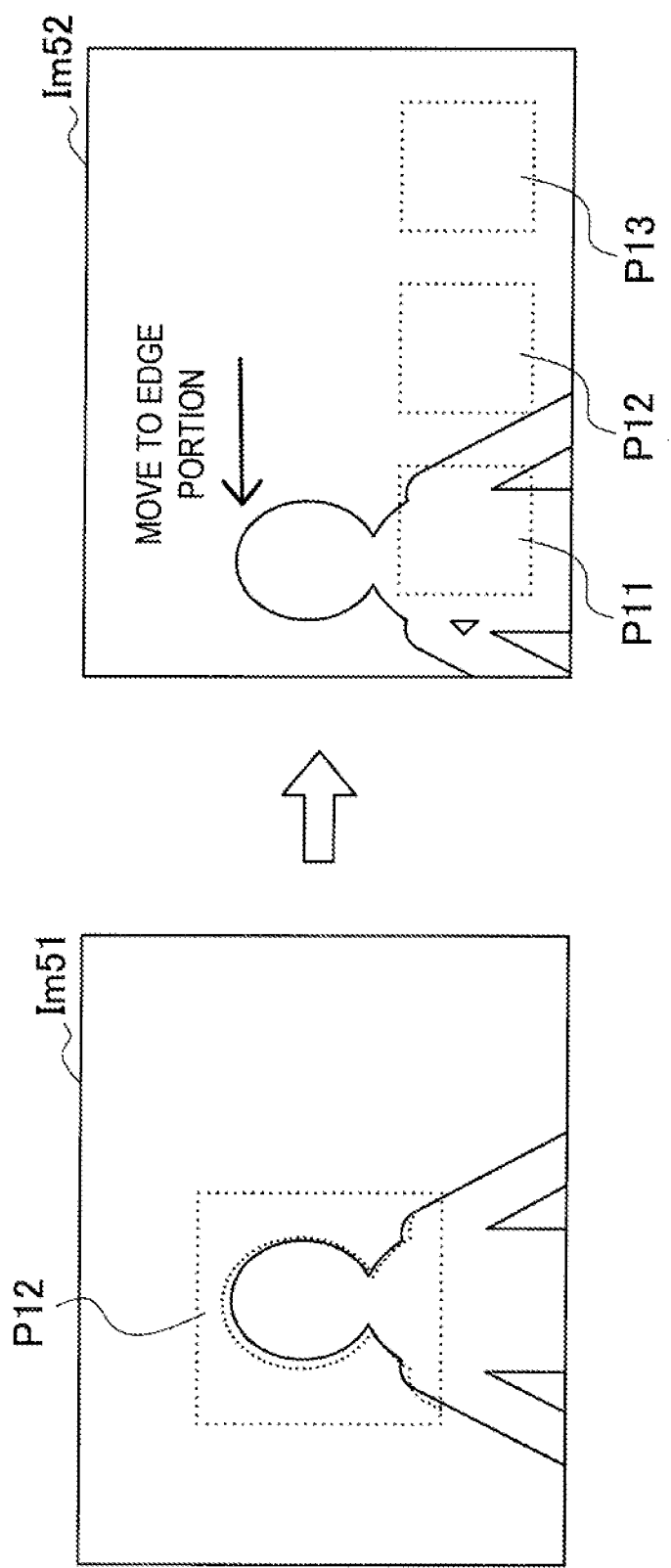

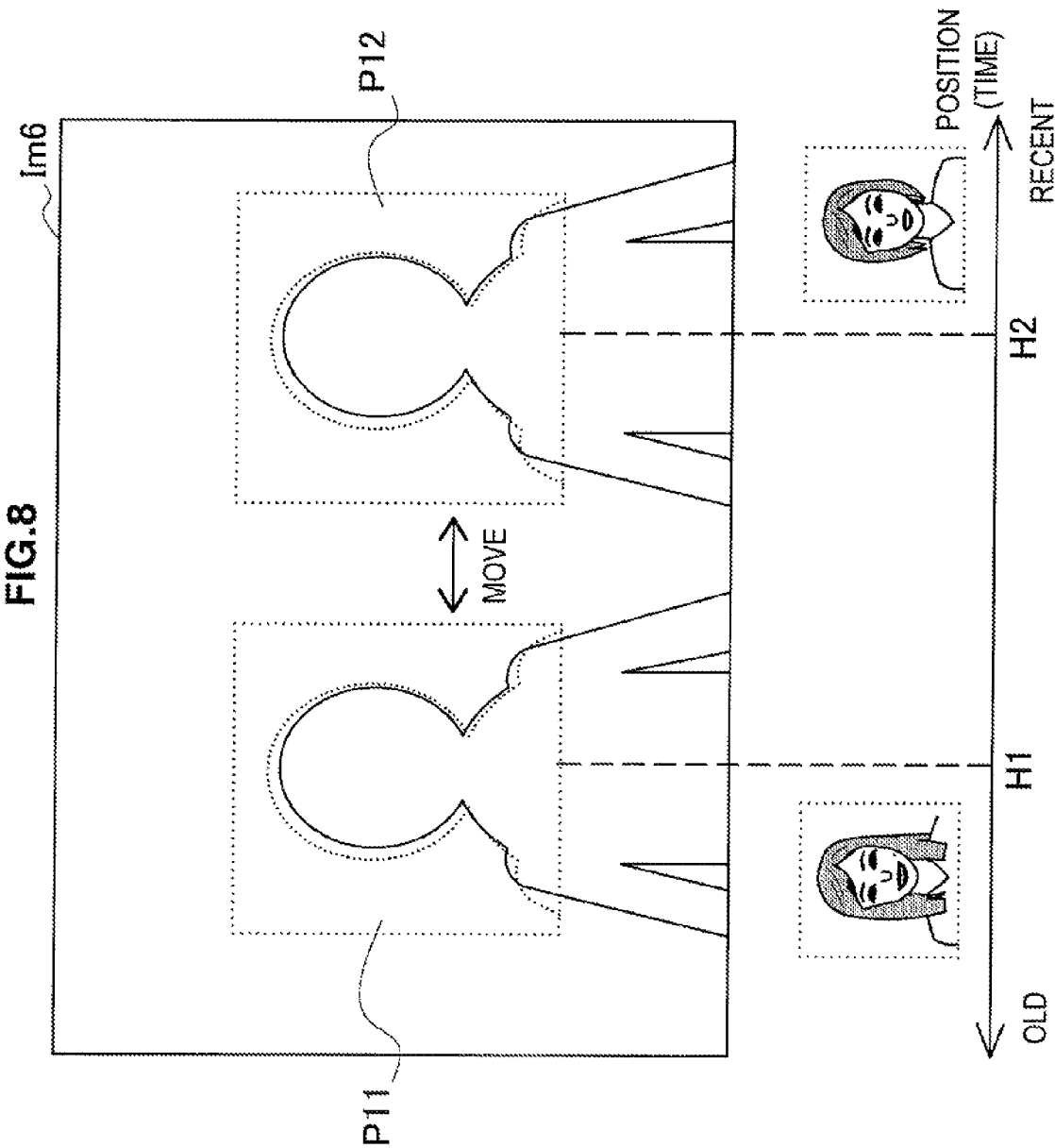

FIG.12B
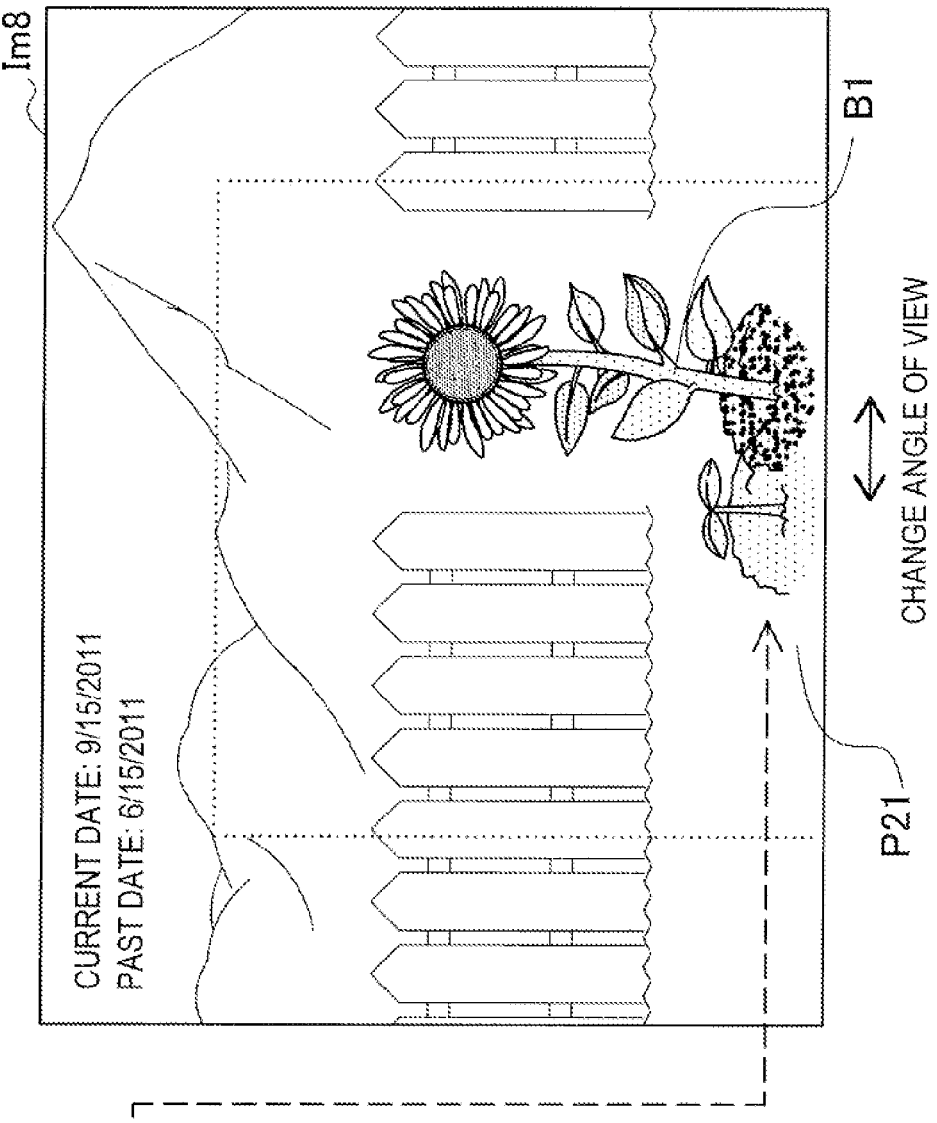
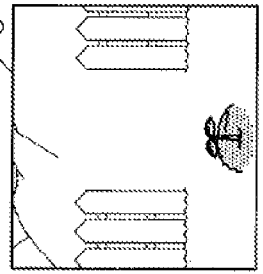
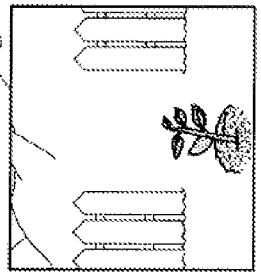
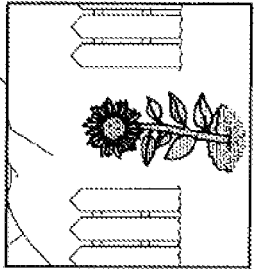

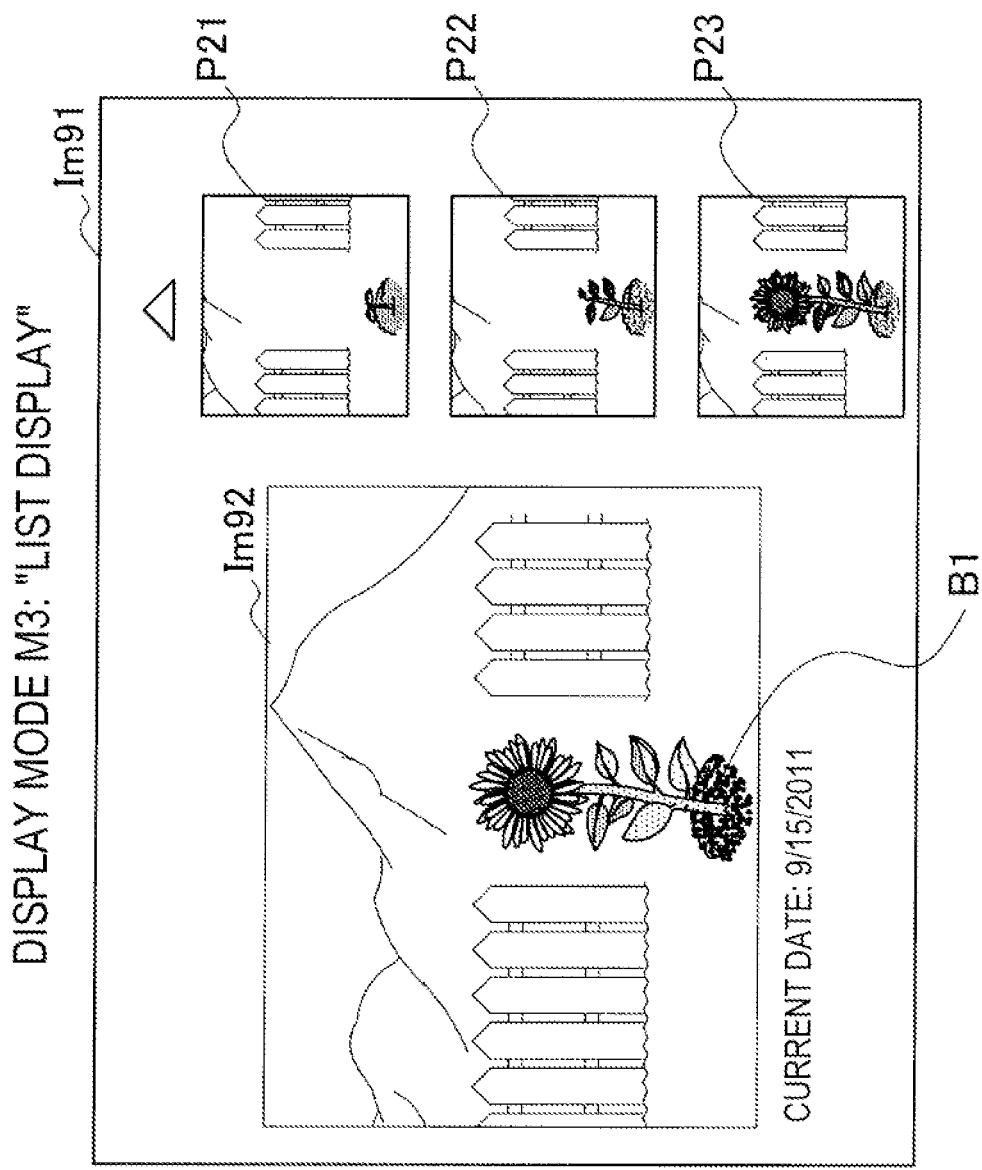

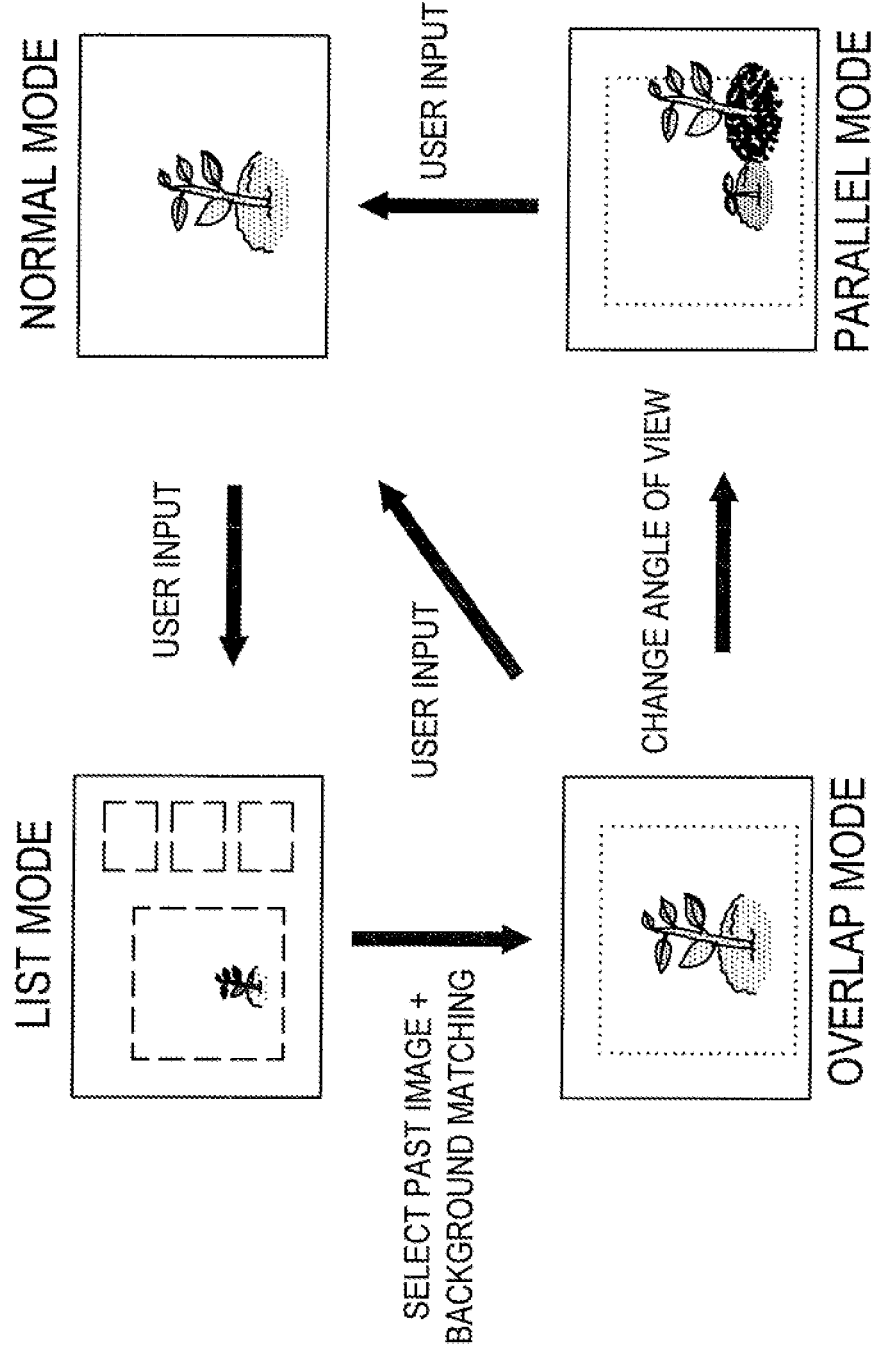

APPARATUS AND METHOD FOR SWITCHING A DISPLAY MODE

CROSS-REFERENCE TO RELATED APPLICATION

The present application claims priority from Japanese Patent Application No. JP 2011-245301 filed in the Japanese Patent Office on Nov. 9, 2011, the entire content of which is incorporated herein by reference.

BACKGROUND

The present disclosure relates to an image processing device, a display control method and a program.

Recording, as images, states of objects that vary from day to day is performed in related art. If images captured at different points in time are compared, it becomes easy to ascertain changes in the appearance of a target object. For example, changes in health conditions of a person or a growth process of a living thing can be ascertained through images that are recorded on a daily basis.

Japanese Patent Application Publication No. JP-A-2009-053328 discloses an image display device that periodically captures a facial image of a user and displays a past facial image in the vicinity of a current facial image that is displayed like a mirror image, such that the past facial image is arranged side by side with the current facial image. At the same time, the image display device outputs a message relating to health conditions of the user that are analyzed based on a difference between these facial images.

SUMMARY

However, the technique described in the above-described Japanese Patent Application Publication No. JP-A-2009-053328 is designed to allow the device to automatically perform the analysis based on a comparison between the facial images. A user interface that allows the user to specify how to compare the images is not provided. In order for the user to visually and appropriately ascertain changes of a target object (the user himself/herself or another photographic subject), it is desirable that the user can easily and flexibly switch a display format of the images to be compared.

To address the above problem, the technology according to the present disclosure provides a user interface that allows a user to easily and flexibly switch a display format of images to be compared.

According to the present disclosure, there is provided an image processing device, including an input image acquisition portion that acquires an input image, a past image acquisition portion that acquires a past image of a photographic subject in the input image, a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image, and a display control portion that superimposes the past image on the input image in accordance with the mode selected by the mode selection portion.

Further, according to the present disclosure, there is provided a display control method that controls display of an image in an image processing device, the display control method including acquiring an input image, acquiring a past image of a photographic subject in the input image, selecting one of modes, using the input image, from among a plurality of modes including a first mode in which the photographic subject in the past image is overlapped with the photographic subject in the input image and a second mode in which the photographic subject in the past image is arranged side by side with the photographic subject in the input image, and superimposing the past image on the input image in accordance with the selected mode.

Further, according to the present disclosure, there is provided a program, including instructions that command a computer to function as an input image acquisition portion that acquires an input image, a past image acquisition portion that acquires a past image of a photographic subject in the input image, a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image, and a display control portion that superimposes the past image on the input image in accordance with the mode selected by the mode selection portion.

With the technology according to the present disclosure, it becomes possible for the user to easily and flexibly switch the display format of the images to be compared.

BRIEF DESCRIPTION OF THE DRAWINGS

FIG. 5A is an explanatory diagram illustrating a first example of a display mode;

FIG. 5B is an explanatory diagram illustrating a second example of the display mode;

FIG. 5C is an explanatory diagram illustrating a third example of the display mode;

FIG. 7A is an explanatory diagram illustrating a first scenario to switch the display mode;

FIG. 7C is an explanatory diagram illustrating a third scenario to switch the display mode;

FIG. 7D is an explanatory diagram illustrating a fourth scenario to switch the display mode;

FIG. 8 is an explanatory diagram illustrating an example in which a photographic subject position is associated with a date and time at which a past image was captured;

FIG. 12B is an explanatory diagram illustrating a second example of the display mode in the application example;

FIG. 12C is an explanatory diagram illustrating a third example of the display mode in the application example; and FIG. 13 is an explanatory diagram illustrating an operation example to switch the display mode in the application example.

DETAILED DESCRIPTION OF THE EMBODIMENT(S)

Figure 1:
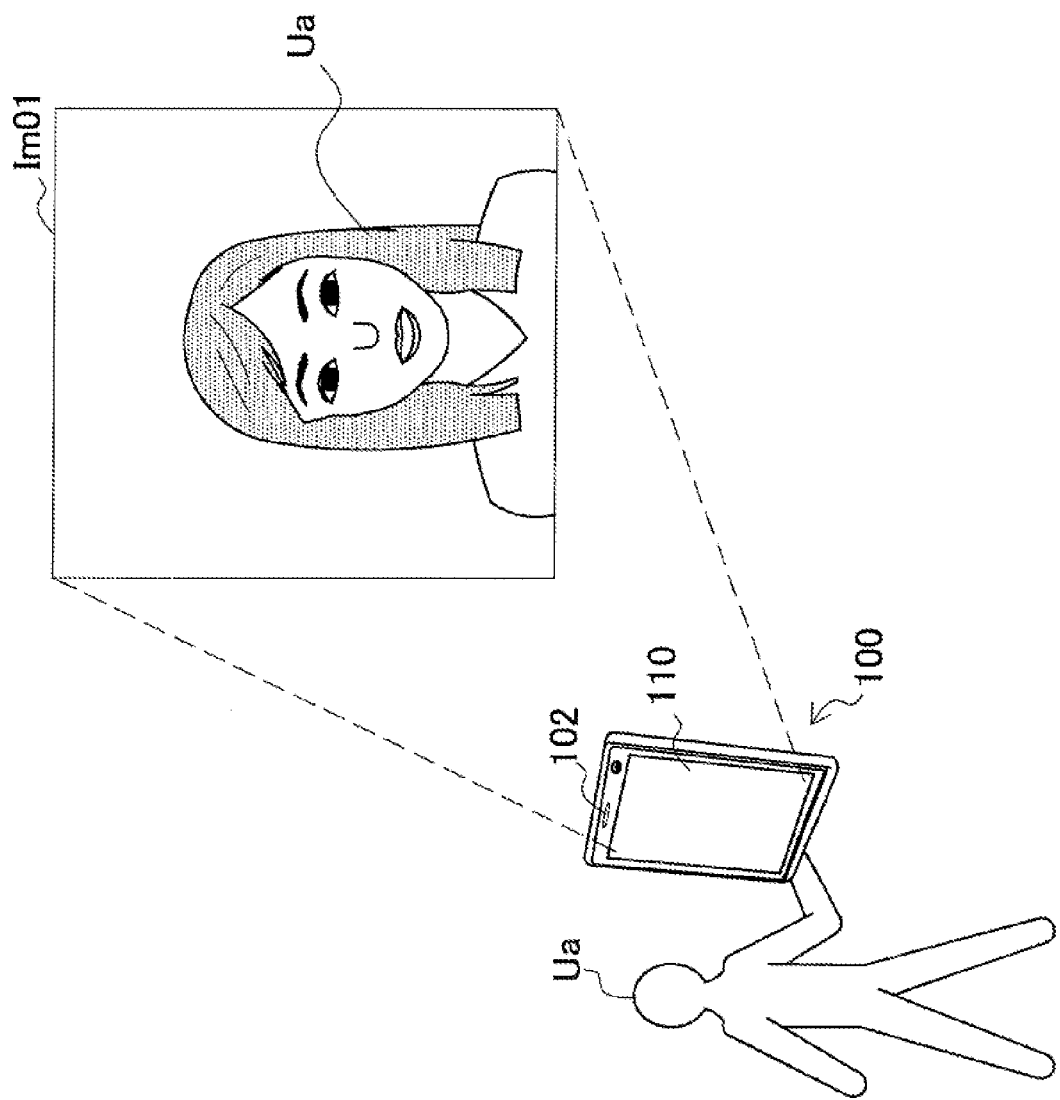
FIG. 1 is a first explanatory diagram illustrating an overview of an image processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. Overview of image processing device
2. Configuration example of image processing device
    2-1. Hardware configuration
    2-2. Functional configuration
3. Flow of processing
4. Application example
5. Conclusion

1. OVERVIEW OF IMAGE PROCESSING DEVICE

Figure 2:
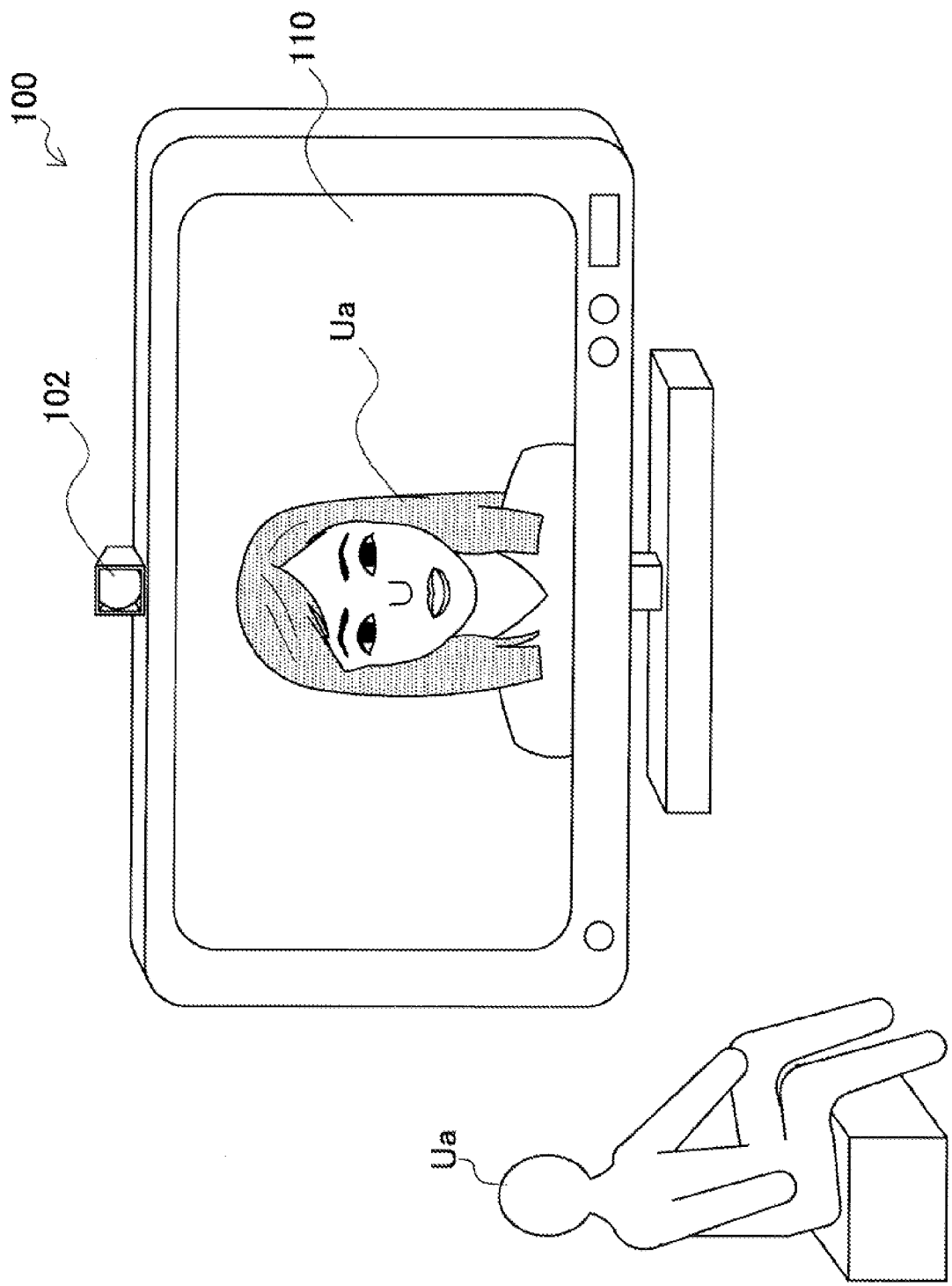
FIG. 2 is a second explanatory diagram illustrating the overview of the image processing device according to the embodiment.

FIG. 1 and FIG. 2 are explanatory diagrams illustrating an overview of an image processing device 100 according to an embodiment of the present disclosure. Referring to FIG. 1, the image processing device 100 owned by a user Ua is shown. The image processing device 100 is provided with an imaging portion 102, which is an inside camera, and a display portion 110. When the user Ua directs a lens of the imaging portion 102 toward himself/herself, an image of the user Ua is captured by the imaging portion 102 and the captured image is displayed on the display portion 110. An image Im01 shown in FIG. 1 is an example of an image captured by the image processing device 100. The face of the user Ua, who is a photographic subject, is in the image Im01. The image processing device 100 acquires this type of captured image as an input image. The input image acquired by the image processing device 100 is accumulated, as a past image, in an internal or external database (DB) of the image processing device 100 such that the past image is associated with date and time information. Then, the image processing device 100 displays the input image and the accumulated past image(s) in accordance with various display modes, which will be explained later.

FIG. 1 shows a mobile terminal as an example of the image processing device 100. However, the image processing device 100 is not limited to this example. The image processing device 100 may be, for example, a tablet PC, a laptop PC, a smart phone, a personal digital assistant (PDA), a digital camera or a terminal device, such as a game terminal. In the example shown in FIG. 2, the image processing device 100 is a device that includes the imaging portion 102 and the display portion 110 and functions like a dressing stand with a mirror. This device may be an information processing device, such as a desktop PC or a digital television device, for example.

2. CONFIGURATION EXAMPLE OF IMAGE PROCESSING DEVICE

Next, configuration examples of the image processing device 100 shown in FIG. 1 and FIG. 2 will be explained in detail.

2-1. Hardware Configuration

Figure 3:
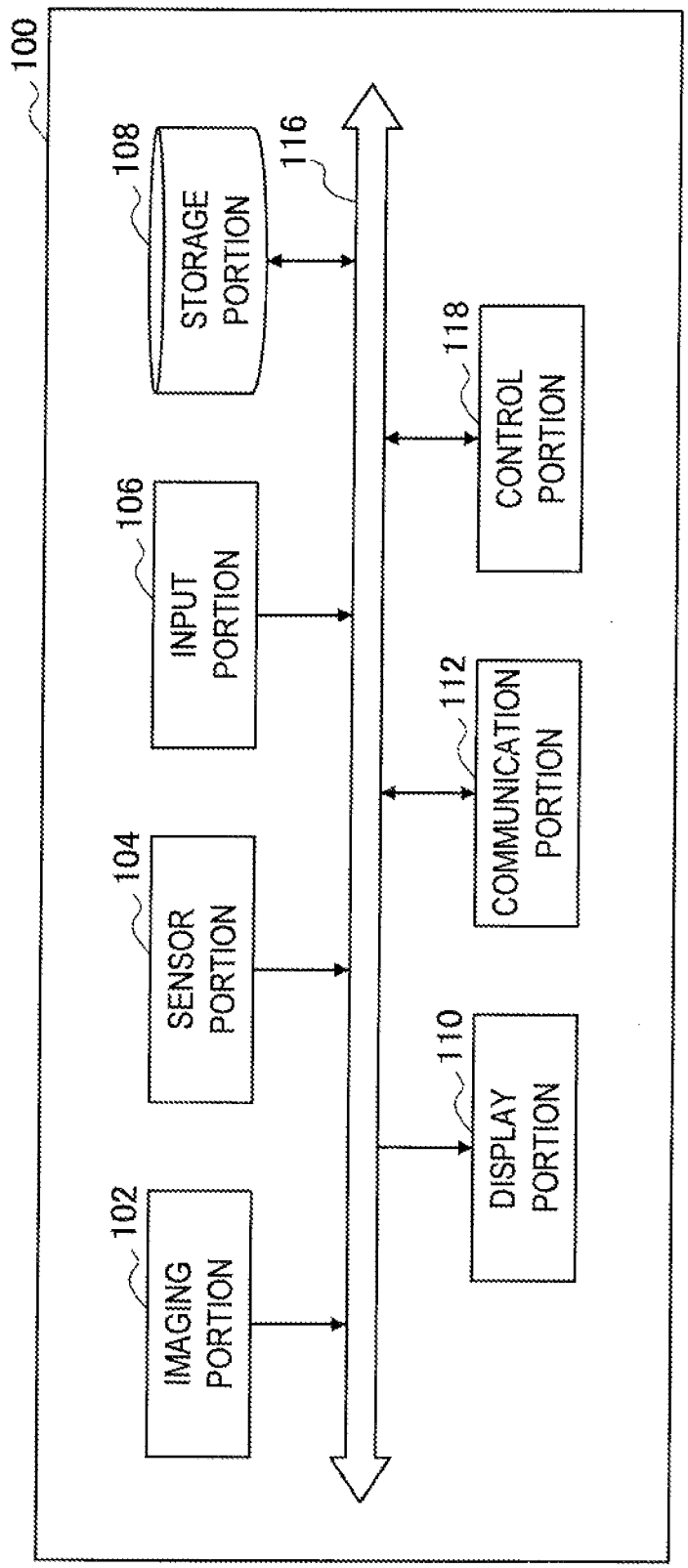
FIG. 3 is a block diagram showing an example of a hardware configuration of the image processing device according to the embodiment.

FIG. 3 is a block diagram showing an example of a hardware configuration of the image processing device 100 according to the present embodiment. Referring to FIG. 3, the image processing device 100 is provided with the imaging portion 102, a sensor portion 104, an input portion 106, a storage portion 108, the display portion 110, a communication portion 112, a bus 116 and a control portion 118.

(1) Imaging Portion

The imaging portion 102 is a camera module that captures an image. The imaging portion 102 generates a captured image by capturing an image of a photographic subject using an imaging element, such as a charge coupled device (CCD), a complementary metal oxide semiconductor (CMOS) or the like. In the example shown in FIG. 1 and FIG. 2, the photographic subject of the image that is captured by the imaging portion 102 is the user of the image processing device 100. On the other hand, in an application example to be explained later, the photographic subject of the image that is captured by the imaging portion 102 is not the user of the image processing device 100. The imaging portion 102 need not necessarily be a part of the image processing device 100. For example, an imaging device that is connected to the image processing device 100 wirelessly or via a cable may be used as the imaging portion 102.

(2) Sensor Portion

The sensor portion 104 is a sensor module to assist processing that is performed by the image processing device 100. For example, the sensor portion 104 may include a positioning sensor, such as a global positioning system (GPS) sensor or a wireless positioning sensor that is based on the strength of a wireless signal. Further, the sensor portion 104 may include a three-axis acceleration sensor and a gyro sensor.

(3) Input Portion

The input portion 106 is an input device that is used by the user to operate the image processing device 100 or to input information into the image processing device 100. The input portion 106 may include, for example, a touch sensor that detects a user's touch on a screen of the display portion 110. Instead of (or in addition to) the touch sensor, the input portion 106 may include a pointing device, such as a mouse or a touch pad. Further, the input portion 106 may include another type of input device, such as a keyboard, a keypad, a button, a switch or a remote controller.

(4) Storage Portion

The storage portion 108 is formed by a storage medium, such as a semiconductor memory or a hard disk, and stores programs and data used by the image processing device 100 to perform processing. The data stored in the storage portion 108 can include, for example, captured image data generated by the imaging portion 102, sensor data generated by the sensor portion 104, and past image data accumulated in the database. Note that, part or all of the programs and data that are explained in the present specification may be acquired from an external data source (for example, a data server, network storage or an externally attached memory), without being stored in the storage portion 108.

(5) Display Portion

The display portion 110 is a display module that is formed by a liquid crystal display (LCD), an organic light-emitting diode (OLED), a cathode ray tube (CRT) or the like. The display portion 110 can be used to display an output image that is generated, for example, by superimposing a past image on an input image. Note that the display portion 110 also need not necessarily be a part of the image processing device 100. For example, a display device that is connected to the image processing device 100 wirelessly or via a cable may be used as the display portion 110.

(6) Communication Portion

The communication portion 112 is a communication interface that mediates communication between the image processing device 100 and another device. The communication portion 112 supports a given wireless communication protocol or a wired communication protocol, and establishes a communication connection with the other device.

(7) Bus

The bus 116 mutually connects the imaging portion 102, the sensor portion 104, the input portion 106, the storage portion 108, the display portion 110, the communication portion 112 and the control portion 118.

(8) Control Portion

The control portion 118 corresponds to a processor, such as a central processing unit (CPU) or a digital signal processor (DSP). The control portion 118 executes the programs stored in the storage portion 108 or in another storage medium, and thereby operates various functions of the image processing device 100, which will be explained later.

2-2. Functional Configuration

Figure 4:
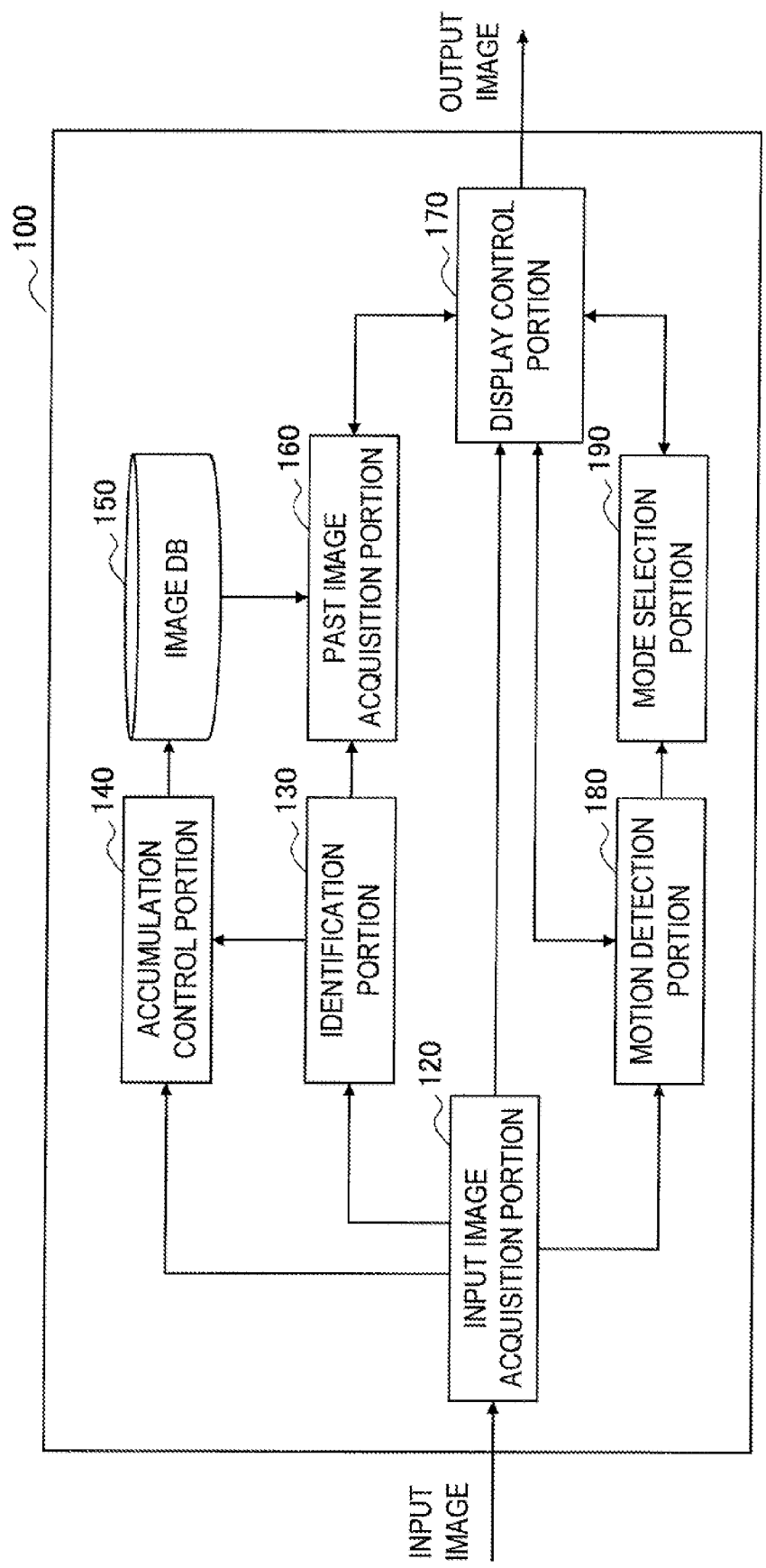
FIG. 4 is a block diagram showing an example of a configuration of a logical function of the image processing device according to the embodiment.

FIG. 4 is a block diagram showing an example of a configuration of a logical function that is achieved by the storage portion 108 and the control portion 118 of the image processing device 100 shown in FIG. 3. Referring to FIG. 4, the image processing device 100 includes an input image acquisition portion 120, an identification portion 130, an accumulation control portion 140, an image DB 150, a past image acquisition portion 160, a display control portion 170, a motion detection portion 180 and a mode selection portion 190.

(1) Input Image Acquisition Portion

The input image acquisition portion 120 acquires, as an input image, the captured image that is generated by the imaging portion 102. In the example shown in FIG. 1 and FIG. 2, the facial image of the user Ua is in the input image acquired by the input image acquisition portion 120. The input image may be a still image or each of frames that form a moving image. The input image acquisition portion 120 outputs the acquired input image to the identification portion 130, the accumulation control portion 140, the display control portion 170 and the motion detection portion 180.

(2) Identification Portion

The identification portion 130 identifies the photographic subject in the input image that is input from the input image acquisition portion 120. The identification portion 130 may identify the photographic subject in the input image by using, for example, an identification algorithm that is based on a known image recognition technology. Instead of this, the identification portion 130 may identify that the user who is logging in to the image processing device 100 is the photographic subject. Further, the identification portion 130 may identify the photographic subject by allowing the user to input identification information, such as an identifier of the photographic subject, via the input portion 106. When the identification of the photographic subject is successful, the identification portion 130 outputs the identification information (for example, an identifier, such as a user ID) of the photographic subject to the accumulation control portion 140 and to the past image acquisition portion 160.

Note that, when use is limited such that a single user only is in the input image as a photographic subject, the identification processing by the identification portion 130 may be omitted.

(3) Accumulation Control Portion/Image DB

The accumulation control portion 140 controls accumulation of past images in the image DB 150. The image DB 150 is a database that accumulates one or more past images of the photographic subject that were captured in the past. For example, every time a predetermined time period (one day or one week, for example) elapses, the accumulation control portion 140 may store, in the image DB 150, an input image that is input from the input image acquisition portion 120 as a past image. Instead of this, in accordance with a command from the user via the input portion 106, the accumulation control portion 140 may store, in the image DB 150, the input image as the past image. For example, the accumulation control portion 140 stores the past image in the image DB 150, in association with the identification information of the photographic subject input from the identification portion 130 and with the date and time information indicating the date and time at which the past image was captured.

(4) Past Image Acquisition Portion

The past image acquisition portion 160 acquires the past image of the photographic subject in the input image, from the image DB 150. For example, from among a plurality of past images stored in the image DB 150, the past image acquisition portion 160 may acquire the past image that is associated with the identification information of the photographic subject input from the identification portion 130. From among a plurality of past images of the same photographic subject, the past image acquisition portion 160 may selectively acquire only the past image that is captured at a predetermined date and time (for example, one day before, one week before, one month before, or one year before the current date and time). The past image acquisition portion 160 outputs the past image acquired in this manner to the display control portion 170.

Note that, instead of acquiring the past image of the photographic subject that was captured in the past, the past image acquisition portion 160 may dynamically generate a past image that represents an estimated appearance of the photographic subject in the past, based on a current input image and past attributes of the photographic subject which were stored in the past or which are specified after the fact. For example, when the photographic subject is a person, the appearance of the photographic subject in the past can be estimated from the appearance of the photographic subject in the current input image, using a difference between current and past data, such as body type data (such as height and weight of the person), age data, or health related data (such as blood pressure or degree of fatigue).

(5) Display Control Portion

The display control portion 170 generates an output image by superimposing the past image acquired by the past image acquisition portion 160 on the input image, in accordance with a display mode that is selected by the mode selection portion 190, which will be described later. Then, the display control portion 170 displays the generated output image on a display of the display portion 110.

In the present embodiment, the display mode of the past image is one of three display modes M1, M2 and M3 that are exemplified in FIG. 5A to FIG. 5C. The first display mode M1 is a mode in which the photographic subject in the past image is overlapped with the photographic subject in the input image. In the present specification, the first display mode M1 is referred to as an "overlap" mode. The second display mode M2 is a mode in which the photographic subject in the past image is arranged side by side with the photographic subject in the input image. In the present specification, the second display mode M2 is referred to as a "parallel (side by side)" mode. The third display mode M3 is a mode in which a list of the plurality of past images acquired by the past image acquisition portion 160 is superimposed on the input image. In the present specification, the third display mode M3 is referred to as a "list" mode.

FIG. 5A is an explanatory diagram illustrating the overlap mode, which is the first example of the display mode. Referring to FIG. 5A, an output image Im11 that is displayed in the overlap mode is shown. The output image Im11 is an image that is generated by superimposing a past image P02, which is one of past images P01 to P03 and which was captured on Aug. 15, 2011, on an input image captured on Sep. 15, 2011. The user Ua with a short hair style is in the input image. The user Ua with a long hair style is in the past image P02. In the overlap mode, the current photographic subject and the past photographic subject are overlapped and displayed in this manner. Therefore, it is easy for the user to observe detailed differences in appearance between the current and past photographic subjects. For example, the overlap mode may be realized by substantially matching, within the output image, mutually corresponding feature point positions of the current and past photographic subjects. The feature point position of a photographic subject may be the position of, for example, eyes, a mouth, shoulders or a waist etc. of a person (or an animal), or may be any position on an edge of a photographic subject other than a person.

FIG. 5B is an explanatory diagram illustrating the parallel mode, which is the second example of the display mode. Referring to FIG. 5B, an output image Im12 that is displayed in the parallel mode is shown. The output image Im12 is also an image that is generated by superimposing the past image P02 captured on Aug. 15, 2011 on the input image captured on Sep. 15, 2011. In the parallel mode, the current and past photographic subjects are arranged in a parallel manner within the output image, as shown in FIG. 5B. Therefore, the user can visually recognize the respective photographic subjects more clearly while comparing the displayed two photographic subjects. For example, the parallel mode may be realized by arranging these photographic subjects with a space between them so that noticeable parts (the person's face, for example) of the current and past photographic subjects are not overlapped with each other. The photographic subject in the past image may be moved to follow the current photographic subject while maintaining the above-described space from a frame to a frame, or need not necessarily follow the current photographic subject after being displayed once.

FIG. 5C is an explanatory diagram illustrating the list mode, which is the third example of the display mode. Referring to FIG. 5C, an output image Im13 that is displayed in the list mode is shown. The past images P01 to P03, which are reduced in size, are displayed as a list in a lower portion of the output image Im13. In the list mode, the display control portion 170 may scroll the list of the past images in accordance with a motion of the user Ua. For example, the display control portion 170 can scroll the list of the past images to the right in response to movement of the user Ua in the left direction, and thus can newly display a past image that is older than the past image P01. In a similar manner, the display control portion 170 can scroll the list of the past images to the left in response to movement of the user Ua in the right direction. A scroll amount of the list of the past images may be dynamically changed in accordance with a speed of the photographic subject. Note that the list of the past images is not limited to the example shown in FIG. 5C, and may be superimposed on any location within the output image.

The display control portion 170 may change the transparency of the past image to be displayed, in accordance with a selected mode. For example, in the overlap mode, the transparency of the past image that is superimposed can be set relatively high so that both the photographic subjects that are overlapped with each other can be sufficiently visually recognized. In the parallel mode, the past image is superimposed on an area in which there is no photographic subject, in the input image. Therefore, the transparency of the past image may be set relatively low. In the list mode, the transparency of the past images may be set to an intermediate value.

Further, in the overlap mode and the parallel mode, the display control portion 170 may change the size, the brightness or the color tone of the photographic subject in the past image to be displayed, respectively, in accordance with the size, the brightness or the color tone of the photographic subject in the input image. For example, when the size of the photographic subject in the input image is larger than the size of the photographic subject in the past image, the past image can be enlarged corresponding to a size ratio. When the photographic subject in the input image is brighter than the photographic subject in the past image, the brightness of the past image can be adjusted so that the photographic subject in the past image becomes brighter. By doing this, influences of varying image capturing conditions can be eliminated and it is thus possible to compare the photographic subjects more appropriately.

Figure 6:
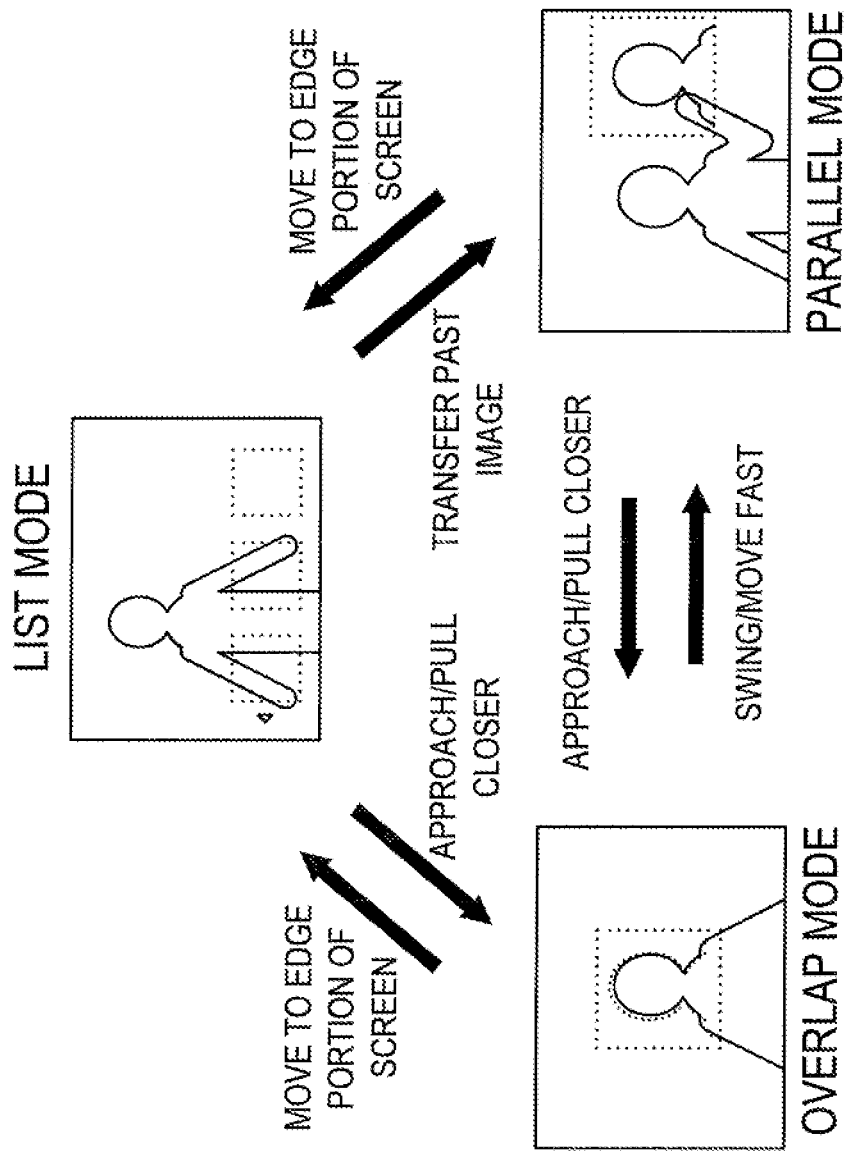
FIG. 6 is an explanatory diagram illustrating motion examples to switch the display mode.

In the present embodiment, switching of the display mode can be performed in accordance with the motion of the photographic subject in the input image. FIG. 6 is an explanatory diagram illustrating motion examples to switch the display mode. Referring to FIG. 6, the motion examples of the photographic subject are described that can be used as triggers to switch between respective pairs of the three display modes. For example, a trigger to switch from the list mode or the parallel mode to the overlap mode may be a motion in which the photographic subject moves closer to one of the displayed past images, or a motion in which the photographic subject pulls one of the displayed past images closer. A trigger to switch from the overlap mode to the parallel mode may be a motion (for example, a swinging motion of the body or the head) of the photographic subject that exceeds a predetermined speed as if to shake off the overlapped past image. A trigger to switch from the list mode to the parallel mode may be a motion in which the photographic subject appears to transfer one of the displayed past images to an area in which the photographic subject does not exist. A trigger to switch from the overlap mode or the parallel mode to the list mode may be movement of the photographic subject to an edge portion of the screen. These motions of the photographic subject are detected by the motion detection portion 180 that will be explained next.

Note that the motions to switch the display mode shown in FIG. 6 are merely an example. In other words, the switching of the display mode may be performed using another type of motion of the photographic subject as a trigger. Further, a user input (for example, touch, click, or depression of a predetermined button) that is detected via the input portion 106 may be used complementarily as an operation to switch the display mode.

(6) Motion Detection Portion

The motion detection portion 180 detects a motion of the photographic subject in the input image that is input from the input image acquisition portion 120. The motion detection portion 180 extracts a photographic subject area in the input image, in accordance with a known technique, such as background difference extraction or skin color area extraction, for example. Next, the motion detection portion 180 determines whether or not the motion of the photographic subject area that is extracted from a series of input images matches one of the motions defined as the trigger to switch the display mode. When the motion detection portion 180 detects the motion defined as the trigger to switch the display mode, the motion detection portion 180 outputs to the mode selection portion 190 a type of the detected motion and (if necessary) an identifier of the past image that is specified by the motion. Hereinafter, exemplary four scenarios to switch the display mode will be explained with reference to FIG. 7A to FIG. 7D.

FIG. 7A is an explanatory diagram illustrating a first scenario to switch the display mode. A user Ub is in an output image Im21 exemplified in FIG. 7A, and further, past images P11 to P13 are displayed in the list mode in a lower portion of the output image Im21. In an output image Im22, the user Ub moves his/her head closer to the past image P12. The motion detection portion 180 can detect this type of motion of the user Ub as the trigger to switch to the overlap mode.

Figure 7B:
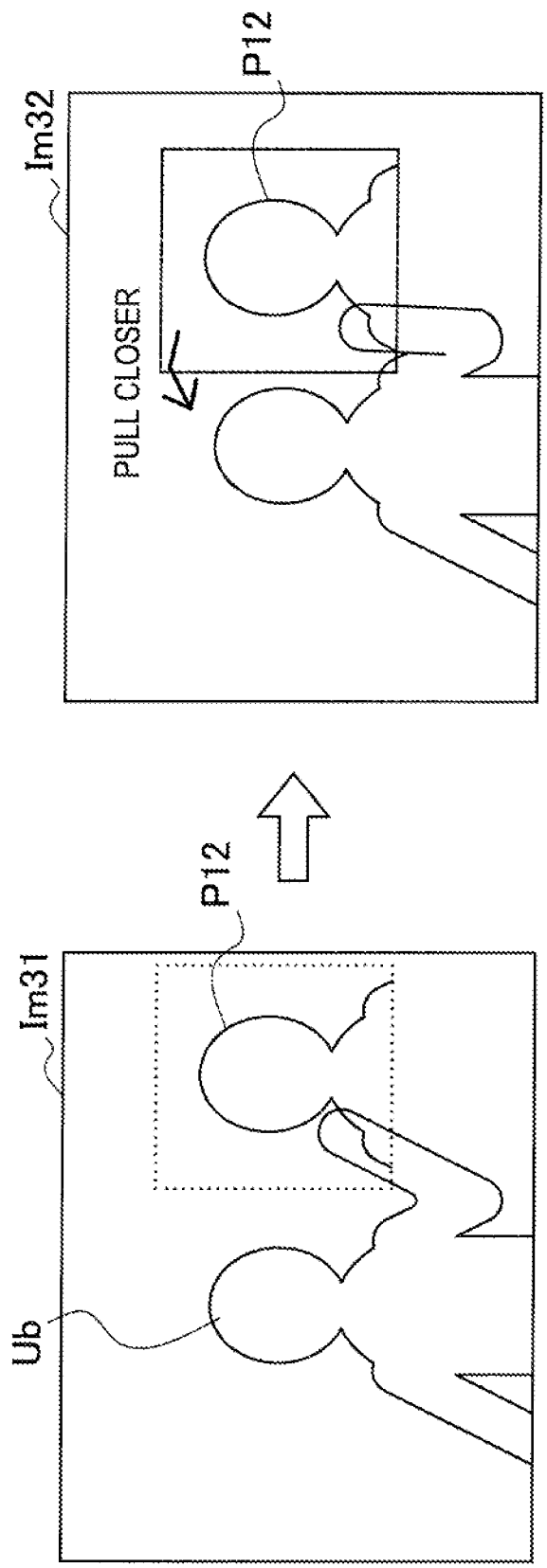
FIG. 7B is an explanatory diagram illustrating a second scenario to switch the display mode.

FIG. 7B is an explanatory diagram illustrating a second scenario to switch the display mode. The user Ub is in an output image Im31 exemplified in FIG. 7B, and further, the past image P12 is displayed in the parallel mode in the vicinity of the user Ub. In an output image Im32, the user Ub is making a motion to pull the past image P12 toward the user Ub, using his/her hand. The motion detection portion 180 can detect this type of motion of the user Ub as the trigger to switch to the overlap mode.

FIG. 7C is an explanatory diagram illustrating a third scenario to switch the display mode. The user Ub is in an output image Im41 exemplified in FIG. 7C, and further, the past image P12 is displayed in the overlap mode such that the past image P12 is overlapped with the user Ub. In an output image Im42, the user Ub is making a motion to swing his/her head. The motion detection portion 180 can detect this type of motion of the user Ub as the trigger to switch from the overlap mode to the parallel mode.

FIG. 7D is an explanatory diagram illustrating a fourth scenario to switch the display mode. The user Ub is in an output image Im51 exemplified in FIG. 7D, and further, the past image P12 is displayed in the overlap mode such that the past image P12 is overlapped with the user Ub. In an output image Im52, the user Ub is moving to an edge portion of the screen. The motion detection portion 180 can detect this type of motion of the user Ub as the trigger to switch to the list mode.

(7) Mode Selection Portion

The mode selection portion 190 selects a display mode from among a plurality of display modes including the above-described three display modes, in accordance with the motion of the photographic subject that is detected by the motion detection portion 180 using the input image. For example, as shown in FIG. 7A, when a motion is detected in which the photographic subject moves closer to one of the past images displayed in the list mode or the parallel mode, the mode selection portion 190 can select the overlap mode. Further, as shown in FIG. 7B, when a motion is detected in which the user, who is the photographic subject, pulls the past image displayed in the list mode or the parallel mode closer, the mode selection portion 190 can select the overlap mode. Further, as shown in FIG. 7C, when a motion of the photographic subject that exceeds the predetermined speed is detected in a case where the past image is displayed in the overlap mode, the mode selection portion 190 can select the parallel mode. Further, as shown in FIG. 7D, when it is detected that the photographic subject has moved to the edge portion of the screen in a case where the past image is displayed in the overlap mode or the parallel mode, the mode selection portion 190 can select the list mode. The mode selection portion 190 outputs to the display control portion 170 an identifier of the display mode that is selected in this manner. Then, the display control portion 170 superimposes the specified past image or the list of the past images on the input image, in accordance with the mode selected by the mode selection portion 190.

Note that, in the overlap mode, the display control portion 170 may change the past image that is superimposed on the input image, in accordance with the position of the photographic subject within the input image. More specifically, when the overlap mode is selected, the display control portion 170 may superimpose the past image captured at a different time on the input image, in accordance with a position of the photographic subject within the input image. For example, a photographic subject position in the horizontal direction within the input image can be associated with the date and time at which the past image was captured.

FIG. 8 is an explanatory diagram illustrating an example in which a photographic subject position is associated with a date and time at which a past image was captured. A coordinate axis that represents the photographic subject position in the horizontal direction within an input image Im6 is shown in a lower portion of FIG. 8. The coordinate axis is associated with a time axis that represents the date and time at which each of the past images was captured. For example, when the photographic subject is located at a position H1 within the input image Im6, the older past image P11 can be superimposed on the input image Im6, and when the photographic subject is located at a position H2, the more recent past image P12 can be superimposed on the input image Im6. In this manner, the photographic subject position is associated with the date and time at which the past image was captured. As a result, the user can freely change the past image only by moving to the left or to the right, and it is thus possible to compare the current image of the user with the past images at various points in time.

3. FLOW OF PROCESSING

Figure 9:
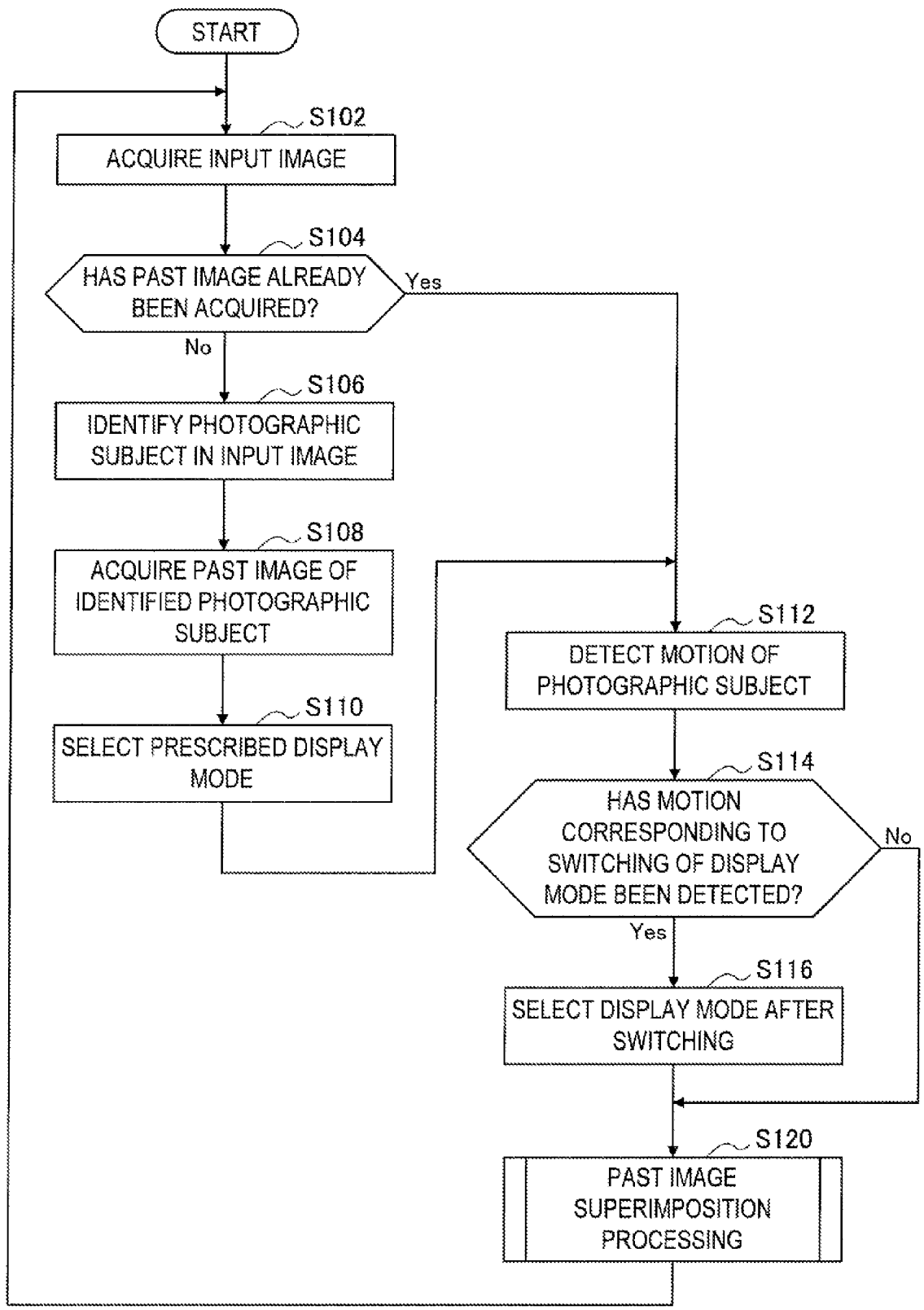
FIG. 9 is a flowchart showing an example of a flow of display control processing according to the embodiment.

FIG. 9 is a flowchart showing an example of a flow of display control processing by the image processing device 100 according to the present embodiment.

Referring to FIG. 9, first, the input image acquisition portion 120 acquires, as the input image, the captured image that is generated by the imaging portion 102 (step S102). After that, processing from step S106 to step S110 can be skipped when the past image has already been acquired by the past image acquisition portion 160 (step S104).

When the past image has not yet been acquired, the identification portion 130 identifies the photographic subject in the input image that is input from the input image acquisition portion 120 (step S106). Next, the past image acquisition portion 160 acquires, from the image DB150, the past image obtained in the past by capturing the photographic subject identified by the identification portion 130 (step S108). In an initial state, the mode selection portion 190 selects a prescribed display mode (for example, the list mode) that is set in advance (step S110).

Next, the motion detection portion 180 detects a motion of the photographic subject in the input image acquired by the input image acquisition portion 120 (step S112). Next, the mode selection portion 190 determines whether or not the motion corresponding to the switching of the display mode has been detected by the motion detection portion 180 (step S114). When the motion corresponding to the switching of the display mode has been detected, the mode selection portion 190 selects the display mode after the switching (step S116). Then, in accordance with the mode selected by the mode selection portion 190, the display control portion 170 performs past image superimposition processing exemplified in FIG. 10 (step S120).

Figure 10:
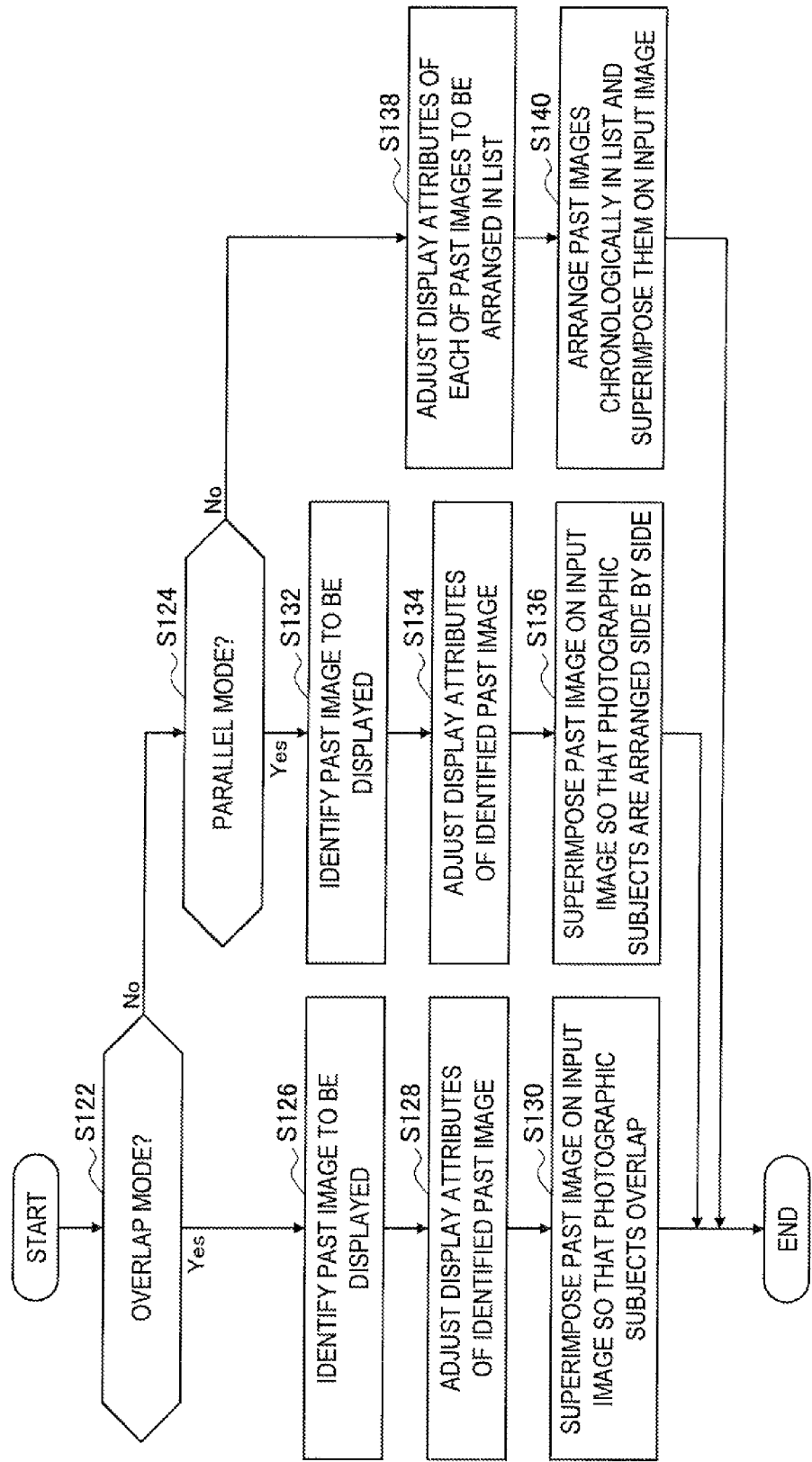
FIG. 10 is a flowchart showing an example of a detailed flow of past image superimposition processing shown in FIG. 9.

FIG. 10 is a flowchart showing an example of a detailed flow of the past image superimposition processing at step S120 in FIG. 9.

The processing shown in FIG. 10 branches in accordance with the currently selected display mode. For example, when the overlap mode is selected, the processing proceeds to step S126 (step S122). When the parallel mode is selected, the processing proceeds to step S132 (step S124). When the list mode is selected, the processing proceeds to step S138.

When the overlap mode is selected, first, the display control portion 170 identifies the past image to be displayed (step S126). The past image that is identified here may be the past image that is specified by the motion of the photographic subject, such as that shown in FIG. 7A or FIG. 7B, for example. Alternatively, as in the example shown in FIG. 8, the past image captured at the date and time that is determined in accordance with a photographic subject position within the input image may be identified as the past image to be displayed. Next, the display control portion 170 adjusts display attributes of the identified past image (step S128). For example, the display control portion 170 may increase the transparency of the past image so that both the photographic subjects that are overlapped with each other can be sufficiently visually recognized. Further, the display control portion 170 may change the size, the brightness or the color tone of the photographic subject in the past image to be displayed, respectively, in accordance with the size, the brightness or the color tone of the photographic subject in the input image. Then, the display control portion 170 superimposes the past image, whose display attributes have been adjusted, on the input image such that the photographic subject in the input image and the photographic subject in the past image are overlapped with each other (step S130).

When the parallel mode is selected, first, the display control portion 170 identifies the past image to be displayed (step S132). In a similar manner to the case of the overlap mode, the past image that is identified here may be, for example, the past image specified by the motion of the photographic subject. Next, the display control portion 170 adjusts display attributes of the identified past image (step S134). For example, the display control portion 170 can set the transparency of the past image lower than that in the overlap mode. Further, the display control portion 170 may change the size, the brightness or the color tone of the photographic subject in the past image to be displayed, respectively, in accordance with the size, the brightness or the color tone of the photographic subject in the input image. Then, the display control portion 170 superimposes the past image, whose display attributes have been adjusted, on the input image such that the photographic subject in the input image and the photographic subject in the past image are arranged in a parallel manner (step S136).

When the list mode is selected, first, the display control portion 170 adjusts display attributes of a plurality of past images to be arranged in a list (step S138). For example, the display control portion 170 may reduce the size of each of the past images. Then, the display control portion 170 arranges the plurality of past images in a list in the order of image capturing date and time, and superimposes the list on the input image (step S140).

4. APPLICATION EXAMPLE

The above-described image processing device 100 provides the user with a simple and flexible user interface that is used to switch the display mode to compare a current image and a past image. In the above-described examples, mainly, an image of the user himself/herself of the image processing device 100 is a comparison target. However, the configuration of the image processing device 100 is applicable even in a case where another photographic subject is a comparison target. Given this, in the present section, such an application example will be explained with reference to FIG. 11 to FIG. 13.

Figure 11:
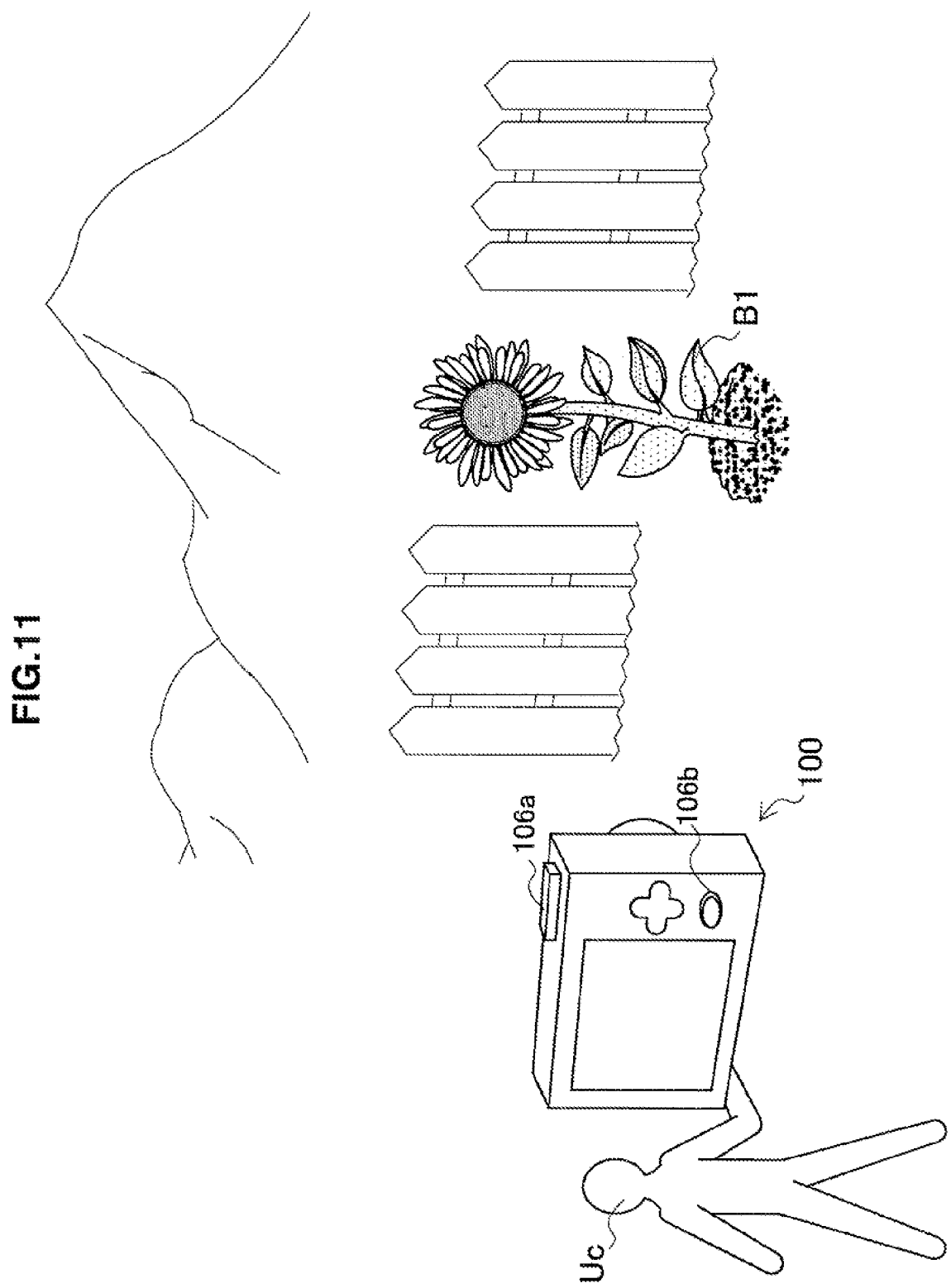
FIG. 11 is an explanatory diagram illustrating an overview of an application example.

FIG. 11 is an explanatory diagram illustrating an overview of an application example. Referring to FIG. 11, the image processing device 100 owned by a user Uc is shown. The image processing device 100 is an imaging device. The image processing device 100 may be, for example, a digital camera or a smart phone etc. having a camera module. The input portion 106 of the image processing device 100 includes a button 106*a* and a button 106*b* shown in FIG. 11. The button 106*a* is the release button 106*a* and accepts an image capturing operation by the user. As explained later, the button 106*b* can be used by the user to operate the display mode. In the example shown in FIG. 11, the lens of the imaging portion 102 of the image processing device 100 is directed at a photographic subject B1. A background exists behind the photographic subject B1.

Also in the present application example, the display mode of the past image can include the overlap mode, the parallel mode and the list mode. Further, a normal mode can exist in which the past image is not superimposed on the input image and the input image is displayed as it is on the display.

Figure 12A:
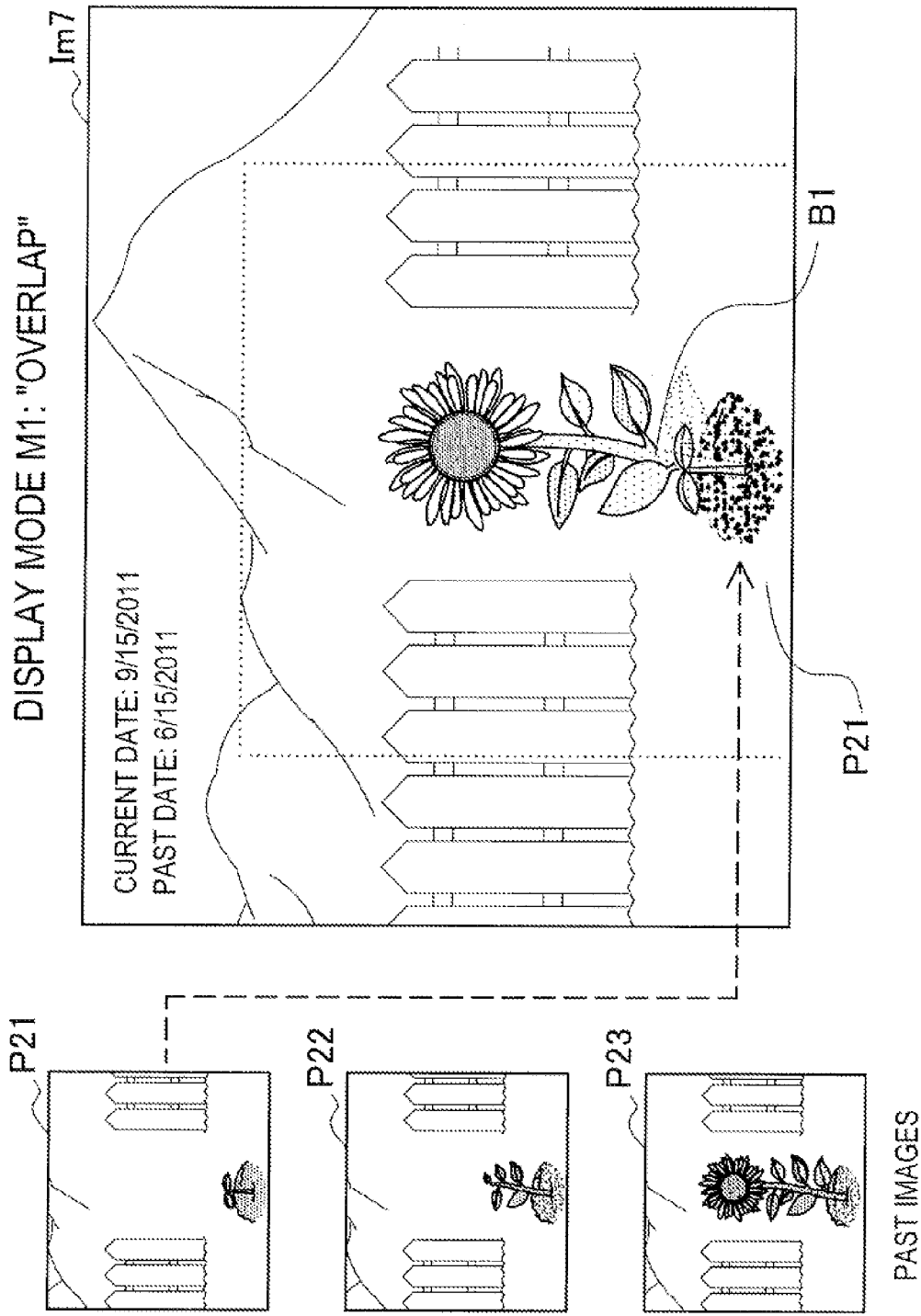
FIG. 12A is an explanatory diagram illustrating a first example of a display mode in the application example.

FIG. 12A is an explanatory diagram illustrating the overlap mode in the present application example. Referring to FIG. 12A, an output image Im7 that is displayed in the overlap mode is shown. The output image Im7 is an image that is generated by superimposing a past image P21, which is one of past images P21 to P23 and which was captured on Jun. 15, 2011, on an input image that is captured on Sep. 15, 2011. The photographic subject B1 three months ago is in the past image P21. The photographic subject B1 that has grown more is in the input image. In the overlap mode, these two photographic subjects are overlapped and displayed.

FIG. 12B is an explanatory diagram illustrating the parallel mode in the present application example. Referring to FIG. 12B, an output image Im8 that is displayed in the parallel mode is shown. The output image Im8 is also an image that is generated by superimposing the past image P21 on an input image similar to that shown in FIG. 12A. Note, however, that the photographic subjects that are respectively in the input image and the past image P21 are arranged side by side instead of being overlapped. This type of parallel mode can be selected when the user changes an angle of view in a case where the past image is displayed in accordance with the overlap mode.

FIG. 12C is an explanatory diagram illustrating the list mode in the present application example. Referring to FIG. 12C, an output image Im91 that is displayed in the list mode is shown. The output image Im91 includes an input image Im92, which is somewhat reduced in size, and a list of the past images P21 to P23. In the present application example, the list mode may be used as a mode to provide a specification screen that allows the user to specify the past image to be superimposed on the input image.

FIG. 13 is an explanatory diagram illustrating an operation example to switch the display mode in the present application example. FIG. 13 illustrates an example of transition between the four display modes including the normal mode, in addition to the overlap mode, the parallel mode and the list mode. Among the four display modes, the prescribed display mode is, for example, the normal mode in which the input image is displayed as it is on the display. When a predetermined user input via the input portion 106 is detected in the normal mode, the display mode switches to the list mode. If one of the past images is specified in the list mode, the mode selection portion 190 searches a position where the background of the specified past image matches the background of the input image. Then, when the position where the backgrounds match each other can be found, the mode selection portion 190 selects the overlap mode. After that, when the photographic subject moves within the input image by the user changing the angle of view, the mode selection portion 190 selects the parallel mode. Note that the position within the input image where the past image is superimposed in the parallel mode does not change from the position where the past image is superimposed in the overlap mode. In a state in which the overlap mode or the parallel mode is selected, if a predetermined user input via the input portion 106 is detected, the display mode switches to the normal mode.

In the example shown in FIG. 13, the switching to the overlap mode may be performed by using, as a trigger, depression of a predetermined button, such as the button 106b shown in FIG. 11. In this case, the mode selection portion 190 can select the overlap mode by performing matching between the past image and the input image in response to the depression of the button 106b. Further, when the user changes the angle of view while depressing the button 106b, the mode selection portion 190 may select the parallel mode. On the other hand, when the button 106b is released, the display mode returns to the normal mode.

Note that, in a case where the image processing device 100 has an image capturing function as in the present application example, if an image capturing operation is accepted in a state in which the past image is displayed in accordance with the overlap mode or the parallel mode, an image generated by superimposing the past image on the input image may be acquired as the captured image and stored. This allows the user to compare the two photographic subjects at a later time, by referring to the stored image.

5. CONCLUSION

The image processing device 100 according to the embodiment and the application example of the image processing device 100 are explained in detail above with reference to FIG. 1 to FIG. 13. According to the above-described embodiment, the input image is used to perform switching between the plurality of past image display modes including the overlap mode in which photographic subjects are overlapped with each other, and the parallel mode in which the photographic subjects are arranged side by side. Therefore, the user can easily and flexibly switch the display format of the two images that are compared. The selection of the display mode can be performed in response to a motion of the photographic subject in the input image. In other words, the motion itself of the photographic subject, which is a comparison target, is used as a trigger to switch the display mode. Therefore, the user can switch the display format without having to pay attention to an input unit that does not relate to the photographic subject.

For example, the trigger to switch to the overlap mode may be detection of the motion in which the photographic subject moves closer to one of the past images, or detection of the motion in which the photographic subject pulls one of the past images closer. Further, the trigger to switch from the overlap mode to the parallel mode may be detection of a motion like shaking off the overlapped past image. These motions are intuitively recognized by the user and the user can easily memorize them. Thus, according to the above-described configuration, it is possible to further improve usability of the user interface to switch the display mode.

Note that the series of control processing by each of the devices explained in the present specification may be achieved by using any one of software, hardware, and a combination of software and hardware. The programs that form the software are stored in advance, for example, in a storage medium that is provided internally or externally of each of the devices. Then, each of the programs is read into a random access memory (RAM) when it is executed, for example, and executed by a processor such as the CPU.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:
an input image acquisition portion that acquires an input image;
a past image acquisition portion that acquires a past image of a photographic subject in the input image;
a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image; and
a display control portion that superimposes the past image on the input image in accordance with the mode selected by the mode selection portion.

(2) The image processing device according to (1),
wherein the mode selection portion selects one of the modes in response to a motion of the photographic subject in the input image.

(3) The image processing device according to (2),
wherein the mode selection portion selects the first mode when a motion is detected in which the photographic subject moves closer to the past image that is being displayed in accordance with a mode different from the first mode.

(4) The image processing device according to (2),
wherein the photographic subject is a user of the image processing device, and
wherein the mode selection portion selects the first mode when a motion is detected in which the user pulls closer the past image that is being displayed in accordance with a mode different from the first mode.

(5) The image processing device according to (2),
wherein the mode selection portion selects the second mode when a motion of the photographic subject that exceeds a predetermined speed is detected when the past image is being displayed in accordance with the first mode.

(6) The image processing device according to any one of (1) to (5),
wherein the past image acquisition portion acquires a plurality of the past images that are captured at different times, and
wherein when the first mode is selected, the display control portion superimposes on the input image one of the past images that are captured at different times, in accordance with a position of the photographic subject within the input image.

(7) The image processing device according to any one of (1) to (6),
wherein the past image acquisition portion acquires a plurality of the past images that are captured at different times, and
wherein the plurality of modes further include a third mode in which a list of the plurality of past images acquired by the past image acquisition portion is superimposed on the input image.

(8) The image processing device according to (7),
wherein the mode selection portion selects the third mode when it is detected that the photographic subject has moved to an edge portion of a screen in a case where the past image is displayed in accordance with one of the first mode and the second mode.

(9) The image processing device according to (2),
wherein the mode selection portion selects the second mode when the photographic subject moves as a result of a change in an angle of view from a state in which the past image is displayed in accordance with the first mode.

(10) The image processing device according to any one of (1) to (9),
wherein the display control portion changes a transparency of the past image to be displayed, in accordance with the mode selected by the mode selection portion.

(11) The image processing device according to any one of (1) to (10),
wherein the display control portion changes one of a size, a brightness and a color tone of the past image to be displayed, respectively, in accordance with one of a size, a brightness and a color tone of the photographic subject in the input image.

(12) The image processing device according to any one of (1) to (11),
wherein the image processing device is an imaging device including an imaging portion that captures the input image and an input portion that accepts an image capturing operation by a user, and
wherein an image generated by superimposing the past image on the input image is acquired as a captured image when the image capturing operation is accepted in a state in which the past image is displayed in accordance with one of the first mode and the second mode.

(13) A display control method that controls display of an image in an image processing device, the display control method including:
acquiring an input image;
acquiring a past image of a photographic subject in the input image;
selecting one of modes, using the input image, from among a plurality of modes including a first mode in which the photographic subject in the past image is overlapped with the photographic subject in the input image and a second mode in which the photographic subject in the past image is arranged side by side with the photographic subject in the input image; and
superimposing the past image on the input image in accordance with the selected mode.

(14) A program including instructions that command a computer to function as:
an input image acquisition portion that acquires an input image;
a past image acquisition portion that acquires a past image of a photographic subject in the input image;
a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image; and
a display control portion that superimposes the past image on the input image in accordance with the mode selected by the mode selection portion.

What is claimed is:
1. An image processing device comprising:
an input image acquisition portion that acquires an input image;
a past image acquisition portion that acquires a past image of a photographic subject in the input image;
a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image; and
a display control portion that superimposes the past image on the input image in accordance with the mode selected by the mode selection portion,
wherein the mode selection portion selects one of the modes in response to a motion of the photographic subject in the input image.

2. The image processing device according to claim 1,
wherein the mode selection portion selects the first mode when a motion is detected in which the photographic subject moves closer to the past image that is being displayed in accordance with a mode different from the first mode.

3. The image processing device according to claim 1,
wherein the photographic subject is a user of the image processing device, and
wherein the mode selection portion selects the first mode when a motion is detected in which the user pulls closer the past image that is being displayed in accordance with a mode different from the first mode.

4. The image processing device according to claim 1,
wherein the mode selection portion selects the second mode when a motion of the photographic subject that exceeds a predetermined speed is detected when the past image is being displayed in accordance with the first mode.

5. The image processing device according to claim 1,
wherein the past image acquisition portion acquires a plurality of the past images that are captured at different times, and
wherein when the first mode is selected, the display control portion superimposes on the input image one of the past images that are captured at different times, in accordance with a position of the photographic subject within the input image.

6. The image processing device according to claim 1, wherein the past image acquisition portion acquires a plurality of the past images that are captured at different times, and
wherein the plurality of modes further include a third mode in which a list of the plurality of past images acquired by the past image acquisition portion is superimposed on the input image.

7. The image processing device according to claim 1, wherein the mode selection portion selects the second mode when the photographic subject moves as a result of a change in an angle of view from a state in which the past image is displayed in accordance with the first mode.

8. The image processing device according to claim 1, wherein the display control portion changes a transparency of the past image to be displayed, in accordance with the mode selected by the mode selection portion.

9. The image processing device according to claim 1, wherein the display control portion changes one of a size, a brightness and a color tone of the past image to be displayed, respectively, in accordance with one of a size, a brightness and a color tone of the photographic subject in the input image.

10. The image processing device according to claim 1, wherein the image processing device is an imaging device including an imaging portion that captures the input image and an input portion that accepts an image capturing operation by a user, and
wherein an image generated by superimposing the past image on the input image is acquired as a captured image when the image capturing operation is accepted in a state in which the past image is displayed in accordance with one of the first mode and the second mode.

11. A display control method that controls display of an image in an image processing device, the display control method comprising:

acquiring an input image;
acquiring a past image of a photographic subject in the input image;
selecting one of modes, using the input image, from among a plurality of modes including a first mode in which the photographic subject in the past image is overlapped with the photographic subject in the input image and a second mode in which the photographic subject in the past image is arranged side by side with the photographic subject in the input image; and
superimposing the past image on the input image in accordance with the selected mode,
wherein the selecting selects one of the modes in response to a motion of the photographic subject in the input image.

12. A non-transitory computer readable storage medium having stored thereon a program comprising instructions that when executed command a computer to function as:

an input image acquisition portion that acquires an input image;
a past image acquisition portion that acquires a past image of a photographic subject in the input image;
a mode selection portion that selects one of modes, using the input image, from among a plurality of modes including a first mode in which the photographic subject in the past image is overlapped with the photographic subject in the input image and a second mode in which the photographic subject in the past image is arranged side by side with the photographic subject in the input image; and
a display control portion that superimposes the past image on the input image in accordance with the mode selected by the mode selection portion,
wherein the mode selection portion selects one of the modes in response to a motion of the photographic subject in the input image.

* * * * *